United States Patent
Abad García et al.

(10) Patent No.: US 12,397,709 B2
(45) Date of Patent: Aug. 26, 2025

(54) REAR-VIEW MIRROR SYSTEM

(71) Applicant: Ficosa Adas, S.L.U., Barcelona (ES)

(72) Inventors: Daniel Abad García, Viladecavalls (ES); Enrique Osorio, Viladecavalls (ES)

(73) Assignee: FICOSA ADAS, S.L.U., Barcelona (ES)

( * ) Notice: Subject to any disclaimer, the term of this patent is extended or adjusted under 35 U.S.C. 154(b) by 262 days.

(21) Appl. No.: 18/160,013

(22) Filed: Jan. 26, 2023

(65) Prior Publication Data
US 2023/0234510 A1 Jul. 27, 2023

(30) Foreign Application Priority Data
Jan. 26, 2022 (EP) ..................................... 22382058

(51) Int. Cl.
| | | |
|---|---|---|
| *B60R 1/26* | (2022.01) | |
| *B60R 1/12* | (2006.01) | |
| *B60R 1/28* | (2022.01) | |
| *H04N 7/18* | (2006.01) | |
| *H04N 23/51* | (2023.01) | |
| *H04N 23/55* | (2023.01) | |

(Continued)

(52) U.S. Cl.
CPC .................. *B60R 1/26* (2022.01); *B60R 1/28* (2022.01); *H04N 7/181* (2013.01); *H04N 23/51* (2023.01); *H04N 23/55* (2023.01); *H04N 23/58* (2023.01); *H04N 23/62* (2023.01); *H04N 23/90* (2023.01); *B60R 2001/1253* (2013.01); *B60R 2300/10* (2013.01); *B60R 2300/802* (2013.01)

(58) Field of Classification Search
CPC .. B60R 1/26; B60R 1/28; B60R 11/04; B60R 1/22; B60R 1/23; H04N 23/51; H04N 23/55; H04N 23/58; H04N 23/62; H04N 23/90
See application file for complete search history.

(56) References Cited

U.S. PATENT DOCUMENTS

| | | |
|---|---|---|
| 7,633,543 B2 | 12/2009 | Shinomiya |
| 11,161,456 B1 | 11/2021 | Day et al. |

(Continued)

FOREIGN PATENT DOCUMENTS

| | | |
|---|---|---|
| DE | 10122929 A1 | 1/2002 |
| DE | 102012019647 A1 | 4/2014 |

OTHER PUBLICATIONS

European Application No. 23382064.6 filed Jan. 26, 2022; Extended European Search Report dated Mar. 13, 2023; 13 pages.

*Primary Examiner* — Nicholas G Giles
(74) *Attorney, Agent, or Firm* — CANTOR COLBURN LLP

(57) ABSTRACT

A rear-view mirror system comprises a mounting assembly arranged outside a motor vehicle, and a first image acquisition unit at least partially received within the mounting assembly configured to acquire a captured image from the exterior of the vehicle. A display device is provided inside the vehicle for displaying to a user a displayed image derived at least in part from the captured image. An electronics carrier comprises an electronic control unit (ECU) connected to the first image acquisition unit so as to generate an image signal for the display device to show the displayed image. The ECU is arranged, together with the electronics carrier, at least partially within the mounting assembly.

19 Claims, 8 Drawing Sheets

(51) Int. Cl.
*H04N 23/58* (2023.01)
*H04N 23/62* (2023.01)
*H04N 23/90* (2023.01)

(56) References Cited

U.S. PATENT DOCUMENTS

2020/0401818 A1* 12/2020 Gibert Castroverde ..................... G06F 3/0486
2021/0006691 A1   1/2021 García Abad
2022/0345606 A1* 10/2022 Sato ..................... H04N 25/589

* cited by examiner

REAR-VIEW MIRROR SYSTEM

CROSS-REFERENCE TO RELATED APPLICATIONS

This application claims the benefit of European Application Serial No. 22382058.0 filed Jan. 26, 2022, the disclosure of which is incorporated herein by reference in its entirety.

BACKGROUND

The present disclosure relates to rear-view mirror systems for motor vehicles and particularly, but not exclusively, to camera monitoring systems (CMS) intended for capturing optical information form the exterior of a motor vehicle.

Known rear-view mirror systems may be conventional (i.e. reflective mirrors) or digital. Digital rear-view may include lateral camera monitoring systems (CMSs) and interior rear-view mirror systems (IRMSs).

In known rear-view mirror systems, a display device is provided including at least one screen that is located inside the motor vehicle. The screen of the display device is suitable for displaying an image captured by a camera module from the exterior of the motor vehicle. In known CMSs, the at least one screen may be located in an interior part of a vehicle door that is visible for a user or driver. In known IRMSs, the at least one screen may be located on or near the windshield. An electronic control unit (ECU) associated with the camera module is also provided. The ECU is also arranged inside the motor vehicle, for example, behind the display device although other locations are possible.

In known rear-view mirror systems, a mounting assembly or winglet is also provided. The mounting assembly or winglet may be a structure that is fixed in an operating position in which it is at least partially outside the motor vehicle. In known lateral CMSs, the mounting assembly or winglet may be arranged on a lateral or side surface of the vehicle. It may be also a movable structure that can be telescopically or pivotally moved between the operating position, and a non-operating position in which the mounting assembly is at least partially inside a recess in the motor vehicle. In known IRMSs, the mounting assembly may be a sharkfin arranged on the roof surface of the vehicle.

The camera module of known rear-view mirrors include an image acquisition unit and a housing attached to an interior of the mounting assembly. In particular, the camera module housing comprises a first camera housing part, or front camera housing, and a second camera housing part, or back camera housing. A lens assembly is at least partially received inside the camera housing, that is, within an inner space defined by said first and second camera housing parts. The lens assembly comprises a lens barrel with a plurality of optical lenses such as, for example, four or five. The lens assembly is partially inserted into the first camera housing part in optical connection with an imager or image sensor that is coupled to a printed circuit board (PCB) which is also fitted within the camera module housing.

It has been found with such known rear-view mirror systems that heat produced by electronic components when in use is detrimental for proper operation.

It is well known that control units generate great amount of heat. Thus, this great amount of heat is very harmful to the display device. At high temperatures, the display device may stop working properly and/or its life span is considerably shortened. In particular, the heat generated by the ECU of the rear-view mirror system negatively affects the display device, and the way around, the heat generated by the display device negatively affects the ECU. In short, the operation of these elements especially in combination with hot weather conditions results in overheating which adversely affects the operation of the electronic components resulting at least in a reduced lifespan thereof.

In view of the above issues, attempts have made in the prior art to provide an efficient thermal dissipation in order to ensure a proper operation of optics and electronics in camera monitoring systems. However, prior art approaches have been shown to involve complex and costly devices while not ensuring good thermal dissipation. Until now there has not been an efficient solution through which an efficient operation is achieved through a cost-effective configuration.

There is still a need for rear-view mirror systems with which efficient operation is ensured regardless the heat generated by their electronic components and the external environmental conditions. There is still a need for much simpler rear-view mirror systems with less components.

The present rear-view mirror system has been found to overcome the above and other deficiencies found in the prior art and to provide a number of additional advantages and benefits.

SUMMARY

The present disclosure is related to a rear-view mirror system for a motor vehicle that may comprise: (i) a mounting assembly; (ii) a first image acquisition unit; (iii) a display device; (iv) an electronics carrier comprising an electronic control unit. Furthermore, the first image acquisition unit, the electronics carrier, and the electronic control unit may be arranged at least partially in the mounting assembly. In a first aspect of the present invention, the electronic control unit may be configured to perform a crop and digital panning operation so as to adjust and/or generate an image signal to the display device for displaying to a user a displayed image derived at least in part from a captured image acquired by the first image acquisition unit in response to a user's action. In a second aspect of the present invention, the electronic control unit comprises, in turn, a processor unit at least configured to serialize at least the captured image. The processor unit may be connected at least to the first image acquisition unit and a peripheral device. Said peripheral device may be at least one of a second image acquisition unit, a blind spot device, a blinker, a power fold, a lighting device, a sensor device, and a camera heater. In a third aspect of the present invention, the first image acquisition unit may comprise a first lens assembly attached to the mounting assembly. Preferably, the first flange may project radially outwards from the first lens assembly and having an interface for attachment to the mounting assembly by a first attaching means.

As stated below, an object of the present invention is to provide a rear-view mirror system with less components so less overall complexity is obtained. In particular, the first aspect of the present invention allows removing expensive coaxial cables and a serializer/deserializer connection required in known prior art digital rear-view mirror systems for transmitting image data from the exterior of the vehicle body to the display device in the vehicle interior. The second aspect of the present invention allows reducing the number of cables coming out of the mounting assembly, particularly when the first image acquisition unit and a peripheral device are provided in the mounting assembly. The third aspect of the present invention allows removing a housing of the first image acquisition unit.

The present rear-view mirror system may comprise a mounting assembly. In the case of lateral rear-view mirror systems, the mounting assembly may comprise a winglet that may be a fixed structure or a movable structure. More specifically, the mounting assembly may be fixed in an operating position in which the mounting assembly is at least partially outside the motor vehicle. Further, the mounting assembly may be telescopically or pivotally movable between said operating position, and a non-operating position in which the mounting assembly is at least partially inside a recess formed in the motor vehicle. Preferably, the mounting assembly may be arranged on a lateral surface of the motor vehicle. In the case of interior rear-view mirror systems (IRMSs), the mounting assembly may be a sharkfin. Preferably, the mounting assembly may be arranged on the roof surface of the motor vehicle of the vehicle.

The mounting assembly may be configured such that at least an interior space is defined therein. In one example, the mounting assembly may comprise a first housing part and a second housing part for being coupled with each other so as to define said interior space. Additional housing parts are of course possible.

Preferably, the winglet may be configured such that the above-mentioned interior space is defined therein. More preferably, the winglet may comprise the above-mentioned first housing part and second housing part for being coupled with each other so as to define said interior space. Preferably, the mounting assembly may further comprise a mounting structure (i.e. a door mirror flag cover). The mounting structure may be adapted to be fixedly mounted on the lateral surface of the vehicle body, for example, on a door. The mounting structure may be further configured to fix the winglet. As stated above, the winglet may project outward from the vehicle at least in the operating position. It may be preferred the mounting structure is configured such that a second interior space is defined therein.

The mounting assembly may comprise a first image acquisition unit. The first image acquisition unit may comprise a first lens assembly that defines a first optical axis. Also, the first image acquisition unit may further comprise a first printed circuit board and a first image sensor coupled to the first printed circuit board. The first image sensor is in optical communication with the first lens assembly.

The first image acquisition unit may be at least partially received within the mounting assembly, preferably in the interior space of the mounting assembly. The first image acquisition unit may be arranged to acquire a captured image from an human machine interface (hmi) exterior field of view (FOV) of the motor vehicle extending at least outside the vehicle. When the digital rear-view mirror is in particular a CMS, the FOV may further encompass a lateral or side surface of the vehicle. It is preferred that the first image acquisition unit may be configured for operating at a frame rate of at least 30 frames per second (fps), and more preferably, at a frame rate of at least 60 fps.

In a preferred example, the first lens assembly and the mounting assembly may be attached to each other. Direct attachment of the first lens assembly and the mounting assembly results that the lens assembly is not required to be provided with a camera module housing. Therefore, less components are required so less overall complexity is obtained. Furthermore, the size of the rear-view mirror may be advantageously reduced so as to cause a reduction of vibrations, aerodynamic noise, and wind drag.

Further image acquisition units may be provided. For example, a second image acquisition unit may be provided in the mounting assembly to capture including a top-view image.

It is to be noted that the first and second lens assemblies are configured for guiding electromagnetic radiation, i.e. light, to the first and second image sensor respectively. Raw image data may be generated by the image sensor preferably with symmetry with respect to a vertical axis referred to as mirroring.

As stated above, the electronics carrier may also be provided. In particular, the mounting assembly may comprise at least a portion of said electronics carrier. The electronics carrier may comprise the electronic control unit (ECU) electrically connected to the above mentioned first printed circuit board (PCB). The electronic control unit (ECU) may further be electrically connected to the display device.

Preferably, both the electronics carrier and the ECU may be arranged at least partially in the mounting assembly. The ECU may comprise, in turn, a processor unit. It is preferred that the processor unit is also arranged in the mounting assembly. More preferably, both the electronics carrier and the ECU may be arranged at least partially in the interior space of the mounting assembly. More preferably, both the entire electronics carrier and the ECU may be arranged in the interior space of the winglet. Alternatively, both the ECU and a portion of the electronics carrier may be arranged in the above-mentioned second interior space, i.e. the interior space of the mounting structure. In any case, the mounting assembly may comprise both the processor unit and the electronics carrier, wherein the processor unit and at least a portion of the electronics carrier may be arranged either in the interior space of the winglet or in the interior space of the mounting structure. Thus, at least in the operating position, the electronics carrier and the ECU are both arranged outside the vehicle body.

As stated above, the electronic control unit (ECU) may be arranged in the mounting assembly. The ECU may be configured to adjust and/or generate an image signal to the display device for displaying to a user a displayed image derived at least in part from the captured image. This is, the image signal may contain the displayed image based on the captured image. Also, the ECU may be connected to the first image sensor and configured to transmit image data that is received at least from the first image sensor to the display device. The ECU may be configured to select at least an image region (or image selection) from the captured image acquired by the first image acquisition unit, the image region being smaller than the captured image and can be moved within the captured image. Said image region can be moved within the captured image in response to a user's action. Further, said image region may be the displayed image (i.e. being displayed by the display device).

A Human Machine Interface (HMI) may also be provided. The HMI may be configured to generate an interface instruction such that the electronic control unit can move the image region within the captured image in response to a user's action. This is, the image region (i.e. crop) can be moved within the captured image in response to a user's action (i.e. digital panning) Preferably, the processor unit (PU) is particularly configured to move the image region within the captured image. The HMI may comprise, for example, buttons, joysticks and other controllers for the display device, such as a control surface, a digital button, and/or a gesture detector. Further, the HMI may be part of or attach to the display device. This is, the display device may preferably comprise the HMI. It is possible the HMI may be connected to the ECU for adjusting the display image by a user and may preferably be configured to generate an interface instruction such that the ECU can move the image region within the captured image. It is also possible that the HMI may be implemented in the display device and may be connected to the ECU through another electronic control unit such as the display controller.

The ECU may be configured to perform a number of operations, such as cropping for selecting a part of an image (i.e. selecting an image region), user interaction through digital panning to move a cropped image, auto-brightness for adjusting the brightness of the image displayed on a screen, monitoring the screen for proper operation for detecting, for example, frozen images, delays in the image display process or latency, detecting dirt in the lens, actuation of nozzles, operating lens heater devices, etc.

The above configuration results in a much simpler, cost effective rear-view mirror system, whose operation is more efficient as compared to prior art rear-view mirror systems. In the present rear-view mirror system, an improved thermal dissipation is advantageously achieved due to an efficient cooling effect of the electronic components. Improved thermal dissipation is an important advantage due to the large amount of heat that is generated by the ECU in operation as compared with other parts such as the display controller and the electronics components associated to the first image acquisition unit (i.e. ISP, image sensor), for example.

As stated above, the present rear-view mirror system may further comprise a display device viewable by the user or driver. The display device may include one or more screens or display panels for displaying a displayed image based on the captured image. The at least one screen of the display device may be fitted inside the motor vehicle such as for example, the cockpit, an A-pillar, or in an interior part of a door in a position visible for a user o driver. Additionally or alternatively, the at least one screen may be located on or near the windshield. Suitable screens may be used such as LCD (Liquid Crystal Display) screens, LED screens such as OLED screens or QLED screens, with no limitation. The screen may be connected to a display controller which may be part of the display device.

A first image acquisition controller such as a first image signal processor (ISP) may also be provided, preferably in the mounting assembly. The first image acquisition unit may preferably comprise the first ISP. It is more preferred that the first image sensor may include the first ISP. This is, the first ISP may be integrated with the image sensor. Alternatively, the first ISP may be provided in the electronics carrier. It is more preferred that the electronic control unit (ECU) may include the first ISP. It is even more preferred that the processor unit (PU) may include the first ISP. The first ISP may be part of or connected to the electronic control unit (ECU) so that raw image data can be transmitted from the first image sensor to the ECU. The first ISP may also be arranged at least partially in the first or second interior space of the mounting assembly. Further, the ECU may be associated with the first image acquisition unit, for example, may be connected to the first image acquisition unit.

The ISP may be configured for converting raw image data generated by the image sensor into a format that can be processed by the ECU. The captured image may be sent by the image acquisition unit to the ECU. In particular, the processor unit (PU) may be configured to adjust an image signal received by the display device. The ECU may be configured to receive the captured image and make a selection, i.e. makes an image region or crop. In particular, the processor unit (PU) may be configured to receive the captured image and make a selection. An image signal containing, among others, said image region or crop may be generated by the ECU and received by the display device through the image signal. As explained, the processor unit (PU) may comprise the first ISP. It is possible that the image region or crop may be produced by the first ISP. A displayed image may be thus displayed by the display device that does not strictly correspond to the captured image from the image acquisition unit but the displayed image may corresponds to the above mentioned image region or crop produced by the ECU.

Unlike prior art rear-view mirror systems, the use of expensive, bulky coaxial cables is not required anymore for transmitting image data from the exterior of the vehicle to the display device in the vehicle interior. In the present rear-view mirror system, the configuration becomes much simpler. Instead, in prior art rear-view mirror systems, coaxial cables together with serializers and deserializers associated with the printed circuit boards and the ECU are required due to the relatively large distance, of the order of 15-20 cm or even 1 m, from the printed circuit boards to the ECU in order to avoid image data from being transmitted over such distance at high speeds with undesired crosstalk effects.

In the present rear-view mirror system, the distance between the printed circuit board of the image sensor and the processor unit is reduced, such as of the order of 5 cm so that the use of coaxial cables together with a serializer in the printed circuit board of the camera module and a deserializer in the ECU is not required anymore. Connection for image data transmission is now made with a simple, low cost, effective flat flex connecting means, such as a flat flex wire or connector that allows for efficiently transmitting high speed image data.

Furthermore, as a result of the arrangement of the electronics carrier and the ECU at least partially in the interior space of the mounting assembly such that at least in the operating position they are outside the motor vehicle, flexible flat connecting means may be used in the present rear-view mirror system for electrically connecting the electronics carrier and the first printed circuit board, particularly for electrically connecting the processor unit and the first printed circuit board. Said flexible flat connecting means excludes coaxial cables and twisted pair cables within the meaning of the present disclosure.

In particular, at least a first flexible flat connecting means may be provided. That is, in the present rear-view mirror system, the electronics carrier and the first printed circuit board are electrically connected to each other through a first flexible flat connecting means for transmitting image data. Such electrical connection of the electronics carrier and the first printed circuit board through a flexible flat connecting means is advantageous.

It is to be noted that the electronics carrier may include not only the ECU that is associated with the first image acquisition unit, but also the above mentioned second image acquisition unit configured to capture top-view images, which will be described below.

It may be also preferred that the electronics carrier and the first printed circuit board are formed as a single electronics component. In preferred examples, the above mentioned flexible flat connecting means may comprise a flexible printed circuit board, also referred herein to as flex PCB, associated with the electronics carrier. The flex PCB may be made of, for example, FR4, especially in case of multilayer board. However other suitable materials with sufficient strength and water resistance may be used as FR2, polyamide, CEM 1, CEM 3 and other paper-based materials with good electrical insulating properties capable of providing at least one electric path along which current is guided.

It may be also preferred that the first printed circuit board may be arranged substantially perpendicular to the electronics carrier. As a result, space is maximized such that a large electronics carrier may be received within a small mounting assembly. This is advantageous and in practice results in less vibrations, less noise, and improved aesthetics.

In an aspect of the present invention, a processor unit at least may be configured to serialize at least the captured image. The processor unit of the ECU may be configured to serialize the image data generated by the image sensor. The electronic control unit may be further configured to adjust and/or generate an image signal for the display device to show the displayed image to the user. Further, the electronics carrier, the electronic control unit, and the processor unit may be arranged at least partially in the mounting assembly. Also, the processor unit may be connected at least to the first image acquisition unit and a peripheral device. Within the meaning of the present application, the peripheral device may be at least one of the following: a second image acquisition unit, a blind spot device (BSD), a blinker, a power fold, a lighting device, a sensor device, and a camera heater. The lighting device may preferably be a puddle lamp or a logo lamp. A sensor device may preferably be a lidar (Light Detection and Ranging) device or a radar device. Other types of technology sensor devices are of course possible.

The rear-view mirror system may further comprise a second electronic control unit arranged in the vehicle interior (i.e. out of the mounting assembly). Therefore, the electronic control unit is arranged in the mounting assembly, whereas the second electronic control unit is arranged in the interior of the vehicle. The second electronic control unit may be configured to deserialize at least the serialized captured image from the processor unit. The second electronic control unit may comprise a second processor unit at least being configured to select at least an image region from the deserialized captured image, the image region being smaller than said deserialized captured image. Therefore, it is possible the electronic control unit arranged in the mounting assembly may not be configured to perform the crop and pan operation since this particular operation may be performed by the second electronic control unit.

The rear-view mirror system may further comprise a Human Machine Interface (HMI) configured to generate an interface instruction such that the second processor unit can move the image region within the deserialized captured image, and wherein the displayed image is derived at least in part from said image region.

Preferably, the first image acquisition unit and the electronic control unit may be connected to each other through the first flexible flat connecting means for transmitting image data. In particular, the processor unit may be connected at least to the first image acquisition unit through said first flexible flat connecting means. More preferably, the first flexible flat connecting means may be a flexible printed circuit board associated with the electronics carrier. The flexible printed circuit board may include one or more electric tracks so as to transmit image data as required.

Preferably, the electronic control unit and the second electronic control unit may be connected to each other through a connecting means for transmitting at least high bandwidth image data, bidirectional control data, and optionally electric power. Said type of connecting means may be a coaxial cable or a twisted pair cable. High bandwidth may be understood as above 0.75 GHz, preferably above 1 GHz, more preferably above 3 GHz. The high bandwidth image data may be transmitted in one direction, from the first processor unit to the second electronic control unit (i.e. second processor unit). The bidirectional control data may be referred to as back channel.

Preferably, the second electronic control unit may comprise or may be connected to a display controller associated with the display device. This is, the second electronic control unit and the display controller may be implemented together or in different locations in the vehicle body.

Preferably, the second electronic control unit and/or the display controller may be connected to a vehicle bus. The vehicle bus may be at least one of a CAN bus, a LIN bus, an ethernet, and an optical fiber. Other vehicle bus communications are of course not ruled out. More preferably, the interface instruction generated by the Human Machine Interface (HMI) may be received by the second electronic control unit or the display controller through the vehicle bus communication.

This aspect of the present invention thus allows reducing the number of cables coming out from the mounting assembly. Instead of having one cable for each peripheral device coming out from the mounting assembly, the peripheral devices may connect to the processor unit so that at least one single coaxial cable may come out from the mounting assembly. If high electrical power is required due to the consumption of peripheral devices, additional cables, for example, power cables may be used as required.

It should be noted that all features of the different aspects of the present invention are interchangeable. They are not explained again for reasons of clarity and conciseness.

It may be possible that the mounting assembly may comprise an outer shell, wherein the outer shell is a one-single injection-molded part over and around at least a portion of the electronics carrier such that said portion of the electronics carrier is substantially encapsulated within the outer shell. It allows an improved sealing performance of the mounting assembly. Since the electronic components (i.e. electronic control unit) is rearranged from the inside the vehicle body (prior art) to the mounting assembly (present invention), it is advantageous to protect said electronic components from external contamination, such as liquids, by the use of the outer shell.

In an aspect of the present invention, the mounting assembly may comprise a first holding surface with first attaching means. The first holding surface may be adapted for attaching the mounting assembly and the first lens assembly directly to each other through the first attaching means. The first holding surface may be located outside the mounting assembly or inside the mounting assembly. Still in other examples, the first holding surface could be formed by one portion located inside the mounting assembly and another portion located outside the mounting assembly.

The first attaching means may comprise any suitable adhesive means such as glue that can be applied for direct attachment of the first lens assembly and the mounting assembly to each other.

Preferably, the first lens assembly may comprise at least a first flange projecting radially outwards from the first lens assembly (i.e. substantially perpendicular to the first optical axis). Said first flange may have an interface for attachment to the mounting assembly. The first flange of the first lens assembly may be attached to the mounting assembly by said interface through either an inner surface of the mounting assembly or an outer surface of the mounting assembly.

In any case, it is preferred that the first flange and the mounting assembly are directly attached to each other by the above mentioned first attaching means. In this case, several examples are envisaged for applying the attaching means between the mounting assembly and the interface of the first flange of the first lens assembly.

In a first example, attaching means such as adhesive may be applied to a bottom surface of the first flange and/or an outer surface of the mounting assembly with the first printed circuit board attached, either by screwing or by adhesive such as glue, to an inner surface of the mounting assembly such that the image sensor and the first lens assembly are aligned in optical connection to each other.

In a second example, attaching means such as adhesive may be applied to a bottom surface of the first flange and/or an outer surface of the mounting assembly with the first printed circuit board attached preferably to a bottom surface or perimeter portion of the first lens assembly. In this example, the first lens assembly may be inserted from the outside the mounting assembly towards the inside thereof with the first flange abutting the mounting assembly, between the flange and the mounting assembly with glue, for example, applied therein. Then the first printed circuit board may be attached, such as glued, to with the first lens assembly.

In a third example, attaching means such as adhesive may be applied to a top surface of the first flange and/or the bottom surface of the mounting assembly with the first printed circuit board attached preferably to a bottom surface or perimeter portion of the first lens assembly. In this example, the first lens assembly and the first printed circuit board may be attached, such as glued, to each other. Then a sub-assembly formed by the first lens assembly and the first printed circuit board may be inserted from the inside of the first lens assembly towards the outside thereof with the first lens assembly abutting the mounting assembly.

In a fourth example, the attaching means for direct attachment of the first lens assembly and the mounting assembly may be a thread. In this example, the lens assembly may be threaded, that is, there may be a thread on the mounting assembly that allows the lens assembly to be attached. This is, the first lens assembly and the mounting assembly may be directly attached to each other by screwing the lens assembly into the mounting assembly.

The mounting assembly may also include a fixing surface abutting a portion of the vehicle so as to secure the mounting assembly outside the vehicle at least in the operating position. Therefore, the mounting assembly may comprise the fixing surface for attaching the mounting assembly to the vehicle and the first holding surface to attach the mounting assembly and the first lens assembly directly to each other. In examples, the fixing surface and the first holding surface are different surfaces of the mounting assembly. Preferably, the mounting structure may comprise the fixing surface. More preferably, the winglet may comprise the first holding surface.

At least one of the first holding surface and the interface of the first flange is preferably non-planar so that the first lens assembly can be moved relative to the mounting assembly. Particularly, the first holding surface may be curved and the first flange may comprise a non-curved surface, or the first holding surface may be planar and the first flange may be curved. Alternatively, both the first holding surface and the first flange may comprise curved surfaces. In this case, a radius of curvature of the interface of the first flange may be substantially the same as a radius of curvature of at least the first holding surface.

The above configuration allows the first printed circuit board and the image sensor to be pre-assembled with the adhesive suitably applied between at least the first flange interface and the above mentioned first holding surface in a pre-cured state such that they both can be moved relative to the mounting assembly in several degrees of freedom as required before final assembly.

The mounting assembly may further comprise at least one positioning portion for attaching the lens assembly and the electronics carrier to each other. In particular, said at least one positioning portion may be formed in the mounting assembly for attaching the lens assembly and the first printed circuit board to each other.

As stated above, the mounting assembly may further comprise a second image acquisition unit. One example of a second image acquisition unit may be an image acquisition unit configured to capture top-view images. Further image acquisition units may be provided.

When a second image acquisition unit is provided, this may include at least a second lens assembly defining a second optical axis. The second optical axis is arranged at an angle with respect to the first optical axis associated with the first image acquisition unit. In particular, the second lens assembly may be arranged focusing on the ground. This is, the optical axis of the second image acquisition unit may substantially point to the ground.

The second image acquisition unit may further include a second printed circuit board, and a second image sensor in optical communication with the second lens assembly. The first printed circuit board and the second printed circuit board may be part of the same electronics carrier.

Both the second lens assembly and the second printed circuit board may also be arranged at least partially in the interior space of the mounting assembly. Preferably, the entire electronics carrier, the ECU and the second printed circuit board are arranged in the mounting assembly. Further, the entire electronics carrier, the ECU and the second printed circuit board may be arranged in the interior space of the mounting assembly. Alternatively, the ECU and a portion of the electronics carrier may be arranged in the above-mentioned second interior space, i.e. the interior space of the mounting structure. In any case, the mounting assembly may comprise the processor unit, the electronics carrier, the first printed circuit board, and the second printed circuit board, wherein the processor unit and at least a portion of the electronics carrier may be arranged either in the interior space of the winglet or in the interior space of the mounting structure, and wherein the first and second printed circuit boards may be arranged in the interior space of the winglet. Thus, at least in the operating position, the second lens assembly and the second printed circuit board are arranged outside the motor vehicle.

The ECU unit may be configured to also receive electronic data from the second image sensor. The electronics carrier and the second printed circuit board may be electrically connected to each other preferably via a second flexible flat connecting means. More particularly, the ECU may be electrically connected to the second image sensor and the display device. Preferably, the ECU may be electrically connected to the second image acquisition controller, the second image sensor, and the display controller.

It may be preferred that the electronics carrier and at least one of the first printed circuit board and the second printed circuit board are formed as a unitary electronics support. Such electronics support may be formed with the electronics carrier, the first printed circuit board, and the above mentioned flex PCB. The electronics support may optionally also include a second flex PCB and the second printed circuit board.

In the above case where a second image acquisition unit is configured to, for example, capturing a top-view image as stated above, with a second lens assembly, a second printed circuit board, a second image sensor, a second flexible flat connecting means, and a second image sensor, the same characteristics, functions, and operations are applicable as described above for the first image acquisition unit.

In a further aspect of the present disclosure, a method for assembling the above-described rear-view mirror system is also disclosed herein.

The method comprises attaching (i.e, directly attaching) the first lens assembly and the mounting assembly to each other and placing a first image sensor inside the mounting assembly so as to establish an optical communication between the first lens assembly and the first image sensor.

Preferably, the step of attaching the first lens assembly and the mounting assembly to each other is carried out at any time after applying an adhesive means on at least one of the mounting assembly and the first lens assembly. The adhesive means may be arranged between the first holding surface of the mounting assembly and the first lens assembly.

It is preferred that placing a first image sensor inside the mounting assembly comprises attaching a first lens assembly and an electronics carrier (e.g. a first printed circuit board) to each other.

A step of curing the adhesive means, for example, by air, UV or thermal radiation may be also included in the method.

For reasons of completeness, various aspects of the present disclosure are set out in the following clauses:

1. A rear-view mirror system for a motor vehicle comprising:
    a mounting assembly located at an exterior part of the motor vehicle body when the mounting assembly is at least in an operating position;
    a first image acquisition unit at least partially received within the mounting assembly, wherein the first image acquisition unit is arranged to acquire a captured image from an exterior field of view of the motor vehicle;
    a display device comprising at least one screen located inside the motor vehicle for displaying to a user a displayed image based on the captured image; and
    an electronics carrier comprising an electronic control unit that comprises, in turn, a processor unit at least configured to serialize at least the captured image,
    wherein the electronics carrier, the electronic control unit, and the processor unit are arranged at least partially in the mounting assembly,
    wherein the processor unit is connected at least to the first image acquisition unit and a peripheral device, wherein the peripheral device is at least one of a second image acquisition unit, a blind spot device (BSD), a blinker, a power fold, a lighting device, a sensor device, and a camera heater,
    wherein it further comprises a second electronic control unit arranged in the vehicle body,
    wherein the second electronic control unit is configured to deserialize at least the serialized captured image from the processor unit, wherein the second electronic control unit comprises the second processor unit at least being configured to select at least an image region from the deserialized captured image, the image region being smaller than the deserialized captured image, wherein the rear-view mirror system further comprises a Human Machine Interface (HMI) configured to generate an interface instruction such that the second processor unit can move the image region within the deserialized captured image, and wherein the displayed image is derived at least in part from said image region.

2. A rear-view mirror system for a motor vehicle comprising:
    a mounting assembly located at an exterior part of the motor vehicle body when the mounting assembly is at least in an operating position;
    a first image acquisition unit at least partially received within the mounting assembly, the first image acquisition unit comprising:
    a first lens assembly defining a first optical axis;
    a first printed circuit board; and
    a first image sensor in optical communication with the first lens assembly and coupled to the first printed circuit board;
    wherein the first image acquisition unit is arranged to acquire a captured image from an exterior field of view of the motor vehicle;
    a display device comprising at least one screen located inside the motor vehicle for displaying to a user a displayed image based on the captured image; and
    wherein the first lens assembly and the mounting assembly are attached to each other.

With a rear-view mirror system according to the clause above, production costs are advantageously reduced since the lens assembly and the printed circuit board carrying the image sensor are attached (i.e. directly attached) to the mounting assembly. As a result, no camera housing is provided such that there is neither front camera housing nor back camera housing. Therefore, no attaching mechanisms are required for attaching front and back camera housings since the camera housing of the image acquisition unit is not provided. A simple, lightweight, and cost-effective assembly is obtained. Further, the size of the rear-view mirror may be advantageously reduced so as to cause a reduction of vibrations, aerodynamic noise, and wind drag.

Furthermore, in the rear-view mirror system according to the clauses above, the visual impact is advantageously reduced. In prior art conventional reflective mirrors, providing camera modules, for example, for blind spot detectors (BSD) or for top-view applications, in the mirror foot or around the mirror head results in a negative visual impact, and also in a greater wind resistance and thus higher fuel/battery consumption.

3. The rear-view mirror system of clause 2, wherein it further comprises a first holding surface with first attaching means being applied for direct attachment of the first lens assembly and the mounting assembly to each other.

4. The rear-view mirror system of clause 2 or 3, wherein the first lens assembly comprises at least a first flange projecting radially outwards from the first lens assembly and having an interface for attachment to the mounting assembly by the first attaching means. Preferably, the first flange of the first lens assembly projects substantially perpendicular to the first optical axis, with the first flange and the first holding surface capable of being attached to each other by the first attaching means.

5. The rear-view mirror system of any of the clauses 2-4, wherein the attaching means is an adhesive means arranged between the first holding surface of the mounting assembly and the interface of the first flange of the first lens assembly. More preferably, the thickness of the adhesive means is between 0.10 mm and 3 mm More preferably, between 0.14 and 1.9 mm.

6. The rear-view mirror system of any of the clauses 3-5, wherein the first holding surface is located inside the mounting assembly.

7. The rear-view mirror system of the clause 3-5, wherein the first holding surface is located outside the mounting assembly.

8. The rear-view mirror system of any of the clauses 2-7, wherein the mounting assembly further comprises at least one positioning portion for attaching the first lens assembly and the first printed circuit board to each other.

9. The rear-view mirror system of clause 8, wherein the positioning portion is part of or is attached to the first lens assembly, the positioning portion comprising a positioning element projecting longitudinally along the first optical axis towards the first printed circuit board for attaching them to each other with a constant predetermined gap there between with the first image sensor optically aligned with the first lens assembly.

10. The rear-view mirror system of any of the clauses 8-9, wherein it further comprises a second attaching means including an adhesive means applied between the positioning portion and the first printed circuit board, the first holding surface being located inside the mounting assembly. Preferably, the thickness of the second adhesive means is between 0.15 mm and 3 mm.

11. The rear-view mirror system of any of the clauses 4-10, wherein at least the first flange of the first lens assembly is arranged at least partially surrounding a lens body.

12. The rear-view mirror system of any the clauses 4-11, wherein at least one of the first holding surface and the interface of the first flange is a non-planar surface so that the first lens assembly can be moved relative to the mounting assembly.

13. The rear-view mirror system of any of the clauses 4-12, wherein a radius of curvature of the interface of the first flange is substantially the same as a radius of curvature of at least the first holding surface.

14. The rear-view mirror system of any of the clauses 2-13, wherein the first PCB is directly attached to the mounting assembly. This is, both the first lens assembly and the first PCB are directly attached to the mounting assembly. Preferably, the first PCB is adhesive directly to the mounting assembly.

15. The rear-view mirror system of any preceding clause, wherein it further comprises an electronics carrier comprising an electronic control unit (ECU) electrically connected to the first printed circuit board.

16. The rear-view mirror system of clause 15, wherein both the electronics carrier and the electronic control unit are arranged in the mounting assembly, preferably, both the electronics carrier and the electronic control unit are arranged at least partially inside the interior space of the mounting assembly.

17. The rear-view mirror system of any of clauses 2-16, wherein the first image sensor is arranged at least partially in the interior space of the mounting assembly.

18. The rear-view mirror system of any preceding clause, wherein the mounting assembly comprises a first housing part and a second housing part for being coupled with each other so as to define the interior space, at least one of the first housing part and the second housing part being configured for at least partially receiving a portion of the lens assembly.

19. The rear-view mirror system of clause 1, wherein a first interior space is defined within the mounting assembly, the first image acquisition unit being at least partially received within the first interior space, and wherein both the electronics carrier and the electronic control unit are arranged at least partially in said first interior space.

20. The rear-view mirror system of clause 1, wherein the mounting assembly comprises a winglet and a mounting structure, wherein the mounting structure is adapted to be fixedly mounted on the lateral surface of the vehicle body and is further adapted to support the winglet, the winglet being projected outward from the vehicle body at least in the operating position, wherein a first interior space is defined within the winglet, the first image acquisition unit being at least partially received within the first interior space, wherein the mounting structure is configured such that a second interior space is defined therein, and wherein both the electronics carrier and the electronic control unit are arranged at least partially in said second interior space.

21. The rear-view mirror system of clause 1, wherein the mounting assembly comprises an outer shell, wherein the outer shell is a one-single injection-molded part over and around at least a portion of the electronics carrier such that said portion of the electronics carrier is substantially encapsulated within the outer shell.

22. The rear-view mirror system of clause 1, wherein the first image acquisition unit and the electronic control unit are connected to each other through a first flexible flat connecting means for transmitting image data, and wherein the electronic control unit and the second electronic control unit are connected to each other through a connecting means for transmitting at least high bandwidth image data, bidirectional control data, and optionally electric power.

23. The rear-view mirror system of any of clauses 15-22, wherein the electronics carrier and the first printed circuit board are electrically connected to each other by a first flexible flat connecting means for transmitting image data.

24. The rear-view mirror system of any of clauses 15-23, wherein the electronics carrier and the first printed circuit board are electrically connected to each other via a first flexible flat connecting means.

25. The rear-view mirror system of any of clauses 15-24, wherein the electronics carrier and the first printed circuit board are formed as a single electronics component.

26. The rear-view mirror system of any preceding clause, wherein the ECU is configured to receive image data at least from the first image sensor, the ECU being electrically connected at least to the display device so as to transmit image data.

27. The rear-view mirror system of any preceding clause, wherein the ECU is configured to select at least an image region from the captured image acquired by the first image acquisition unit, the image region being smaller than the captured image and movable within the captured image, said image region being displayed by the display device.

28. The rear-view mirror system of any of the clauses 15-27, wherein it further comprises a Human Machine Interface (HMI) comprising a control surface and/or a gesture detector connected to the electronic control unit for adjusting the display image by a user.

29. The rear-view mirror system of any preceding clause, wherein the Human Machine Interface (HMI) is configured to generate an interface instruction such that the ECU can move the image region within the captured image.

30. The rear-view mirror system of any of the clauses 28-29, wherein the display device includes the Human Machine Interface (HMI).

31. The rear-view mirror system of any preceding clause, wherein it further comprises a first image acquisition controller associated with the first image acquisition unit.

32. The rear-view mirror system of clause 31, wherein the first image acquisition controller comprises an image signal processor (ISP).

33. The rear-view mirror system of any preceding clause, wherein it further comprises a display controller associated with the display device.

34. The rear-view mirror system of any preceding clause, wherein it further comprises a second image acquisition unit that includes:
   at least a second lens defining a second optical axis arranged at an angle with respect to the first optical axis,
   a second printed circuit board; and
   a second image sensor in optical communication with the second lens assembly;
   wherein the second image acquisition unit is arranged to acquire a captured image from an exterior field of view of the motor vehicle; and
   wherein the second lens assembly and the mounting assembly are directly attached to each other.

35. The rear-view mirror system of clause 34, wherein both the second lens assembly and the second printed circuit board are arranged at least partially inside the interior space of the mounting assembly; and wherein the ECU is configured to receive electronic data from the second image sensor.

36. The rear-view mirror system of clause 35, wherein the electronics carrier and at least one of the first printed circuit board and the second printed circuit board are formed as a unitary electronics support.

37. The rear-view mirror system of any of the clauses 34-36, wherein the electronics carrier and the second printed circuit board are electrically connected to each other via a second flexible flat connecting means.

38. The rear-view mirror system of any of the clauses 34-37, wherein the second lens assembly includes a second flange projecting radially outwards therefrom, wherein the second flange is adapted to be at least partially mounted on a second holding surface of the mounting assembly for direct attachment of the second lens assembly to the mounting assembly through second attaching means.

39. The rear-view mirror system of clause 38, wherein at least one of the second holding surface and the interface of the second flange is a non-planar surface so that the second lens assembly can be moved relative to the mounting assembly.

40. The rear-view mirror system of any of the clauses 34-39, wherein the electronics carrier is arranged substantially perpendicular to the second optical axis.

41. The rear-view mirror system of any of clauses 34-39, wherein the electronics carrier is arranged substantially parallel to the second printed circuit board.

42. The rear-view mirror system of any preceding clause, wherein the mounting assembly is arranged in at least one of a lateral surface and a roof surface of the motor vehicle. Preferably, the mounting assembly comprises a fixing surface abutting a portion of the vehicle so as to secure the mounting assembly outside the vehicle at least in the operating position.

43. The rear-view mirror system of any of the clauses 34-42, wherein the electronic control unit is at least five times greater than at least one of the first and second image sensors.

44. The rear-view mirror system of any preceding clause, wherein the mounting assembly is movable between an operating position in which the mounting assembly is at least partially outside the motor vehicle, and a non-operating position in which the mounting assembly is at least partially inside a recess in the motor vehicle.

45. The rear-view mirror system of any preceding clause, wherein the mounting assembly further comprises a protective cover configured to be arranged to at least partially cover the recess in the motor vehicle when the mounting assembly is the operating position.

46. The rear-view mirror system of clause 45, wherein the protective cover is further adapted to cover the recess of the motor vehicle substantially flush with respect to an exterior surface of the vehicle.

47. The rear-view mirror system of any of the clauses 15-46, wherein the electronic control unit (500) comprises, in turn, a processor unit that is connected at least to the first image acquisition unit and a peripheral device, wherein the peripheral device is at least one of a second image acquisition unit, a blind spot device (BSD), a blinker, a power fold, a lighting device, a sensor device, and a camera heater.

The rear-view mirror system assembling method described above is also applicable to a rear-view mirror system according to the above clauses.

The method of assembling a rear-view mirror for motor vehicles comprises the following steps:
   preferably, attaching a first image sensor to a first printed circuit board;
   preferably, applying a second adhesive means on at least one of the first lens assembly and the first printed circuit board;
   preferably, placing the first lens assembly on the first printed circuit board;
   preferably, moving the first lens assembly relative to the first printed circuit board in a first condition of the second adhesive means, the first condition of the second adhesive means being a non-cured state;
   preferably, turning the first condition of the second attaching means into a second condition which corresponds to its cured state. This is, by curing the second adhesive means, the first lens assembly is arranged in a suitable or desired position and brought into focus with the first image sensor to be optically center-aligned therewith. The first lens assembly and the first image sensor are thus aligned in the second condition of the second adhesive means. More preferably, curing the second adhesive means is performed by air, UV or thermal radiation;
   preferably, applying an adhesive means on at least one of the mounting assembly and the first lens assembly;
   attaching a first lens assembly and a mounting assembly directly to each other; preferably, it further comprises the step of curing the adhesive means by air, UV or thermal radiation;
   placing the first image sensor in an interior space within the mounting assembly, the first image sensor being optically aligned to the first lens assembly;
   preferably, providing an ECU to the first printed circuit board or to an electronics carrier comprising the first printed circuit board, and electrically connecting the first image sensor to said ECU, the ECU being configured to adjust a display image upon a human machine interface (HMI) instruction;
   preferably, repeating all or some of the above-mentioned steps to provide a second image acquisition unit; and
   preferably, attaching the mounting assembly directly to the vehicle such that the first lens assembly is arranged outside the vehicle in an operating position.

Thus, a second lens assembly and the electronics carrier are attached to each other to establish an optical communication there between. A second lens assembly is attached to the mounting assembly, and adhesive means is applied on at least one of the mounting assembly and the electronics carrier. Adhesive means is applied also on at least one of the mounting assembly and said second lens assembly.

BRIEF DESCRIPTION OF THE DRAWINGS

Examples of the present disclosure will be described in the following, with reference to the appended drawings, in which.

DETAILED DESCRIPTION

A rear-view mirror system 100 is shown in the non-limiting examples of the drawings.

Figure 8:
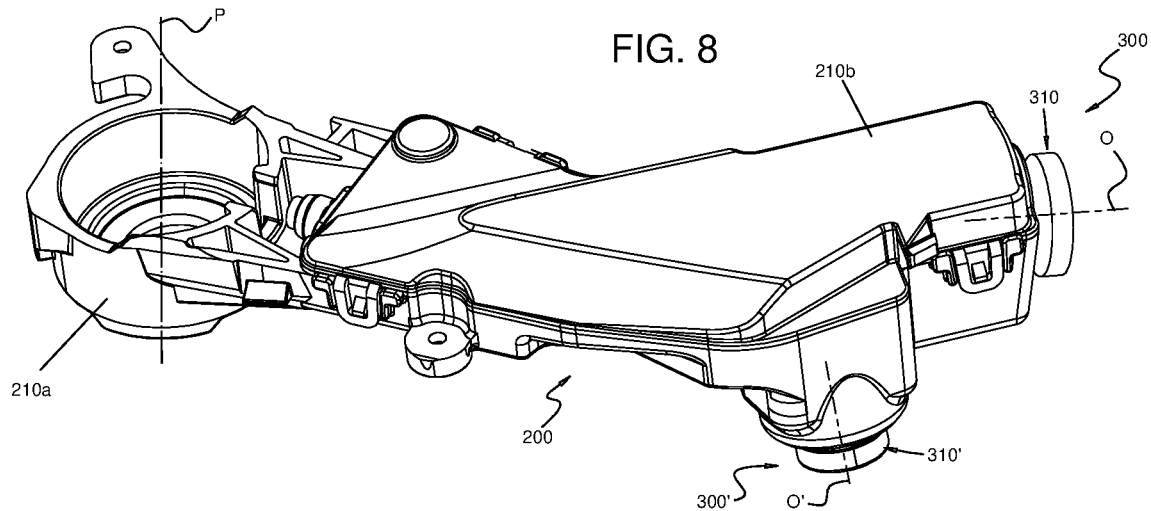
FIGS. 8 and 9 are fragmentary perspective views of the mounting assembly or winglet of the rear-view mirror system, with parts removed for clarity.
Figure 9:
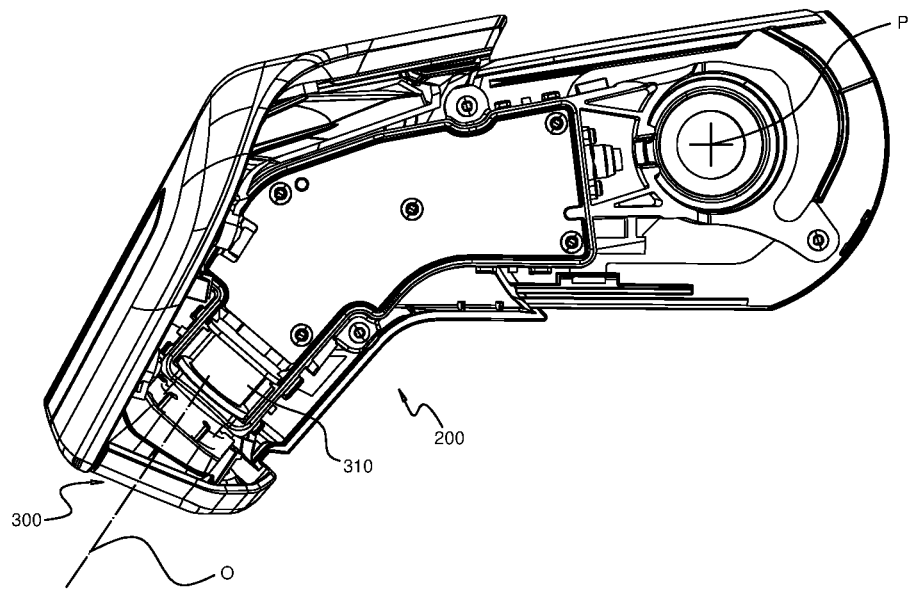

In particular, one example of a digital rear-view mirror system 100 is illustrated. It comprises a mounting assembly 200 that may include a winglet 240. The winglet 200 may be a structure that is always fixed in an operating position in which it is at least partially outside a motor vehicle 10 as shown in FIGS. 1, 2 and 7a, 7b. In other examples, the winglet 240 may be capable of being pivoted around an axis P, shown in FIGS. 7a, 8 and 9, between the operating position, shown in said FIGS. 1, 2 and 7a, 7b, and a non-operating position, not shown, in which it is at least partially received inside a recess in the motor vehicle 10, for example when the motor vehicle 10 is parked, stopped, or not in use.

Figure 3:
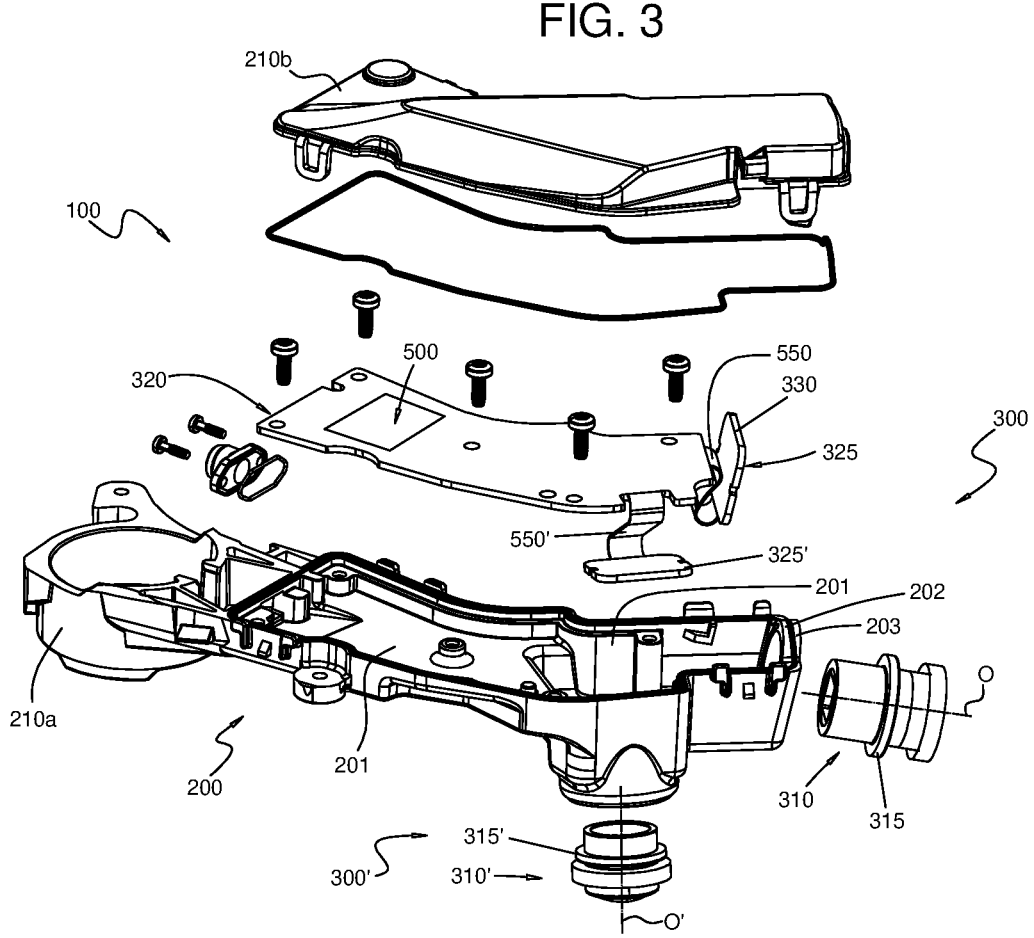
FIG. 3 is a general exploded view of the present rear-view mirror system.
Figure 10A:
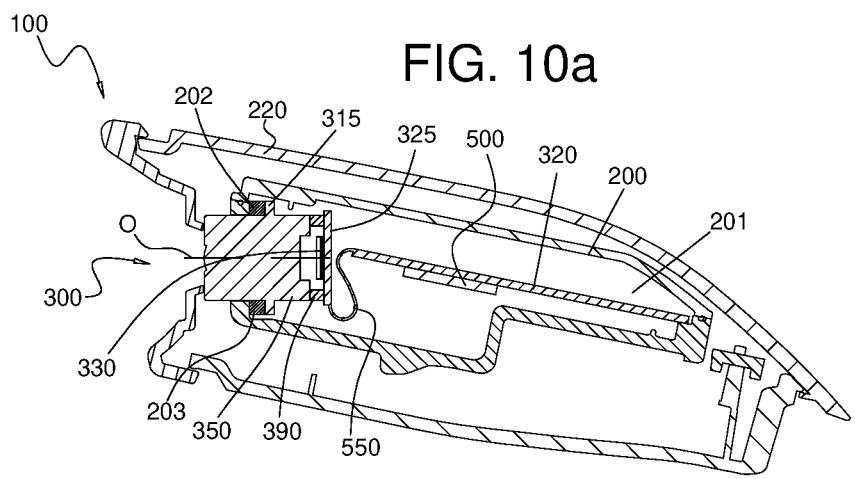
FIGS. 10a and 10b are cross section views of the mounting assembly or winglet of the rear-view mirror system illustrating the attachment of the first lens assembly to the mounting assembly.

The mounting assembly 200 of the rear-view mirror system 100 comprises a first housing part 210a and a second housing part 210b, as shown in FIG. 3. The first housing part 210a and the second housing part 210b are intended for being coupled with each other so as to define an interior space 201 therewithin. Within said interior space 201 defined in the winglet 200, a first image acquisition unit 300 and a second image acquisition unit 300' are received. As an alternative to using the first and second housing parts 210a, 210b, the mounting assembly 200 comprises an outer shell, wherein the outer shell is a one-single injection-molded part over and around at least a portion of the electronics carrier 320 such that said portion of the electronics carrier 320 is substantially encapsulated within the outer shell (not shown). It allows an improved sealing performance of the mounting assembly 200. Further, the mounting assembly 200 may further comprise a protective cover 220 as shown in FIG. 10a.

Figure 11:
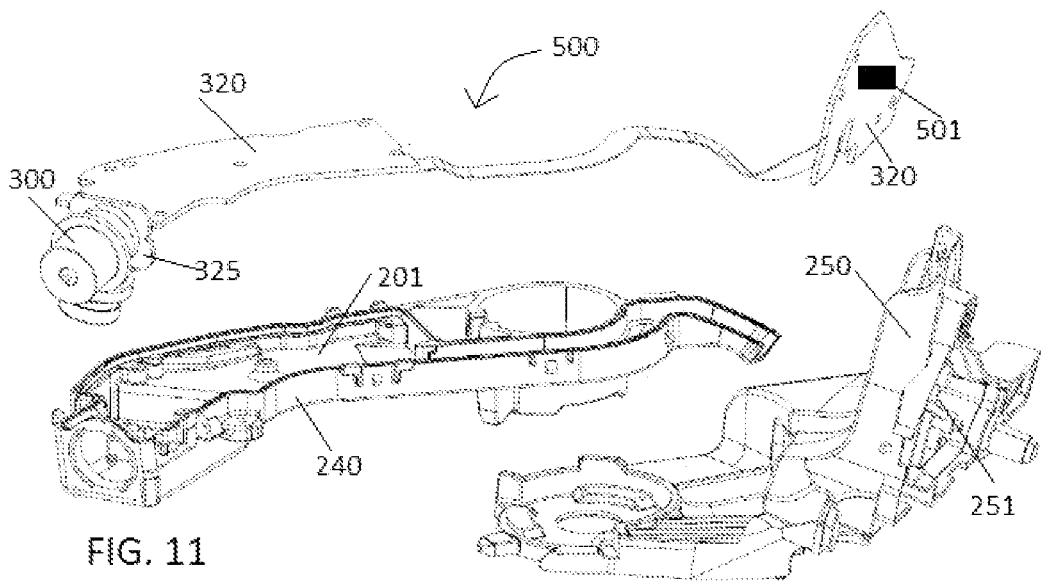
FIG. 11 is an exploded view showing an example where the electronic control unit may be arranged in the interior space defined in the mounting structure.

As shown in FIG. 11, the mounting assembly 200 comprises a winglet 240 and a mounting structure 250 (e.g. a door mirror flag cover). The mounting structure 250 is adapted to be fixedly mounted on the lateral surface of the vehicle body, for example, on a door. The mounting structure is further configured to support the winglet. Further, the first interior space 201 is defined within the winglet 240, the first image acquisition unit 300 being at least partially received within said first interior space 201. The mounting structure 250 is configured such that a second interior space 251 is defined therein, and wherein both the electronics carrier 320 and the electronic control unit 500 are arranged at least partially in said second interior space 251.

As shown in FIG. 3, the first image acquisition unit 300 comprises a first lens assembly 310, a first image sensor 330, and a first printed circuit board (PCB) 325. The first image sensor 330 is in optical communication with the first lens assembly 310. The first lens assembly 310 defines a first optical axis O, as shown in FIGS. 3, 7a, 7b, 8, 9, 10a and 10b and is configured to capture an image from a rearward exterior field of view (FOV) of the motor vehicle 10. The rearward exterior FOV includes at least a lateral or side exterior surface of the motor vehicle 10. In other cases, the FOV may be different such as, for example, in an interior rearview monitoring system (IRMS), not shown. In IRMSs, the mounting assembly 200 is a sharkfin that may be fixed for example on a vehicle roof (not shown). In IRMSs, an image rearward outside the vehicle 10 is captured by an image acquisition unit not encompassing a lateral or side portion of the exterior surface of the vehicle 10 but optionally a portion of the exterior surface of the vehicle roof.

The first image acquisition unit 300 is configured for operating at a frame rate of at least 30 frames per second (fps), and more preferably, at a frame rate of at least 60 fps.

Figure 2:
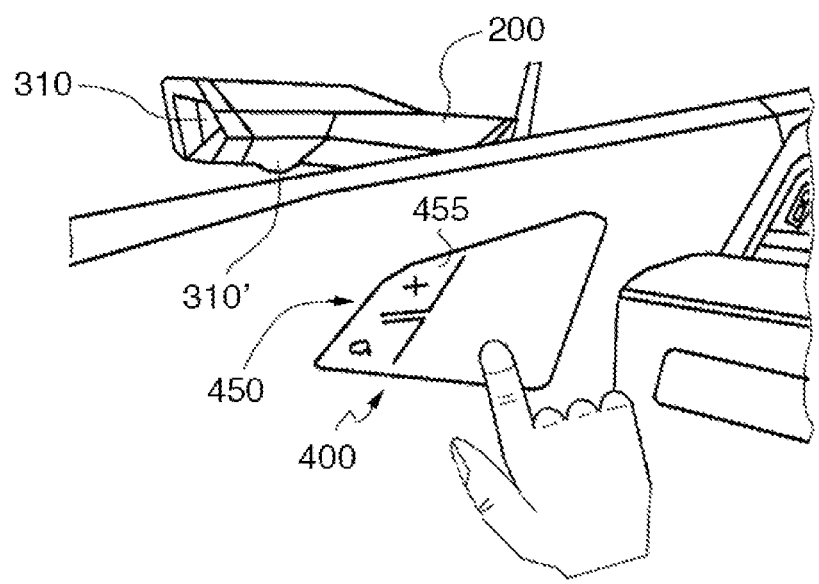
FIG. 2 is a fragmentary perspective view diagrammatically showing a portion of a vehicle door in which a display device of the present rear-view mirror system is mounted.

The second image acquisition unit 300' comprises a second lens assembly 310', a second image sensor 330', and a second printed circuit board (PCB) 325'. The second image sensor 330' is in optical communication with the second lens assembly 310'. The second lens assembly 310' defines a second optical axis O' and is configured to capture an image from a top exterior field of view (FOV) of the motor vehicle 10. For this purpose, the second lens assembly 310' may be arranged focusing on the ground, as shown in FIG. 2. The second optical axis O' defined by the second lens assembly 310' is arranged at an angle with respect to the first optical axis O defined by the first lens assembly 310, as shown in FIG. 3.

The first and second image acquisition units 300, 300' include respective first and second image acquisition controllers, such as image signal processors (ISPs). The ISPs are also arranged in the above-mentioned interior space 201 defined within the winglet 200.

In the first and second PCBs 325, 325' of the first and second image acquisition units 300, 300', respectively, corresponding first and second image sensors 330, 330' are coupled in optical communication with the respective first and second lens assemblies 310, 310'.

The first and second lens assemblies 310, 310' are directly attached to the winglet 200. No camera module housing is thus required for the lens assemblies 310, 310'.

An ECU 500 is provided, as shown in FIGS. 3-6 and 11. The ECU 500 is electrically connected to the first image acquisition unit. In particular, the processor unit 501 is connected to the above-mentioned image sensors 330, 330' for image data transmission. In examples, the processor unit is connected to a display device 400 fitted inside the motor vehicle 10. The image acquisition controllers or ISPs may be integrated into the image sensors 330, 330'. That is, the ECU 500 is electrically connected to the image acquisition controllers or ISPs, the image sensors 330, 330', and a display controller, not shown.

The ECU 500, and in particular the processor unit 501, is configured to perform at least one of the following operations:
 (i) cropping for selecting a part of an image, and user interaction through digital panning to move a cropped image; and
 (ii) serializing at least the captured image.

The ECU 500 is optionally performing operations such as auto-brightness for adjusting the brightness of the image displayed on a screen, monitoring the screen for proper operation for detecting, for example, frozen images, delays in the image display process or latency, detecting dirt in the lens, actuation of nozzles, operating lens heater devices, etc.

The display device 400 in the non-limiting example shown includes a screen or display panel suitable for displaying images captured by the first and second image acquisition units 300, 300' encompassing at least a side exterior surfaces of the motor vehicle 10. Said screen or display panel is fitted inside the motor vehicle 10 such as for example, in an interior part of a door, visible to a user and/or driver, and is connected to the above-mentioned display controller which is part of the display device 400.

The display device 400 in the example described herein includes a Human Machine Interface (HMI) 450 connected to the ECU 500 for adjusting the display image by a user. The HMI 450 in the example shown in FIG. 2 include buttons 455 but it may further include joysticks and/or other controllers for the display device. However, it may be envisaged that the HMI 450 is connected to the ECU 500. For example, the display device 400 may be configured to display a digital button interface such that operations and processing are carried out by the ECU 500.

The HMI 450 is configured to generate an interface instruction to be received by the ECU 500 to adjust the displayed image by a user or driver. The HMI 450 includes a control surface that may be arranged at any location within the vehicle 10, for example, it may be included in the display device.

The user or driver may interact to the HMI 450 for moving an image region or crop. The HMI 450 is configured to generate an interface instruction upon an input received from the user. The first image sensor 330 is configured to generate an image raw data, and the ECU 500 may be configured to generate an image signal containing at least the crop data to be displayed by the display device 400. The image signal may be generated based on the interface instruction and the raw image data. By moving the crop, it is possible to change at least the displayed field of view or FOV (e.g. displayed image) without any mechanical actuator.

Said crop can be moved within the captured image in response to a user's action, which may be: i) a touch by the user on a control surface preferably provided on the display device and/or ii) a gesture made by the user to a gesture detector that can be implemented in said display device or by another device using any gesture detection technology. This enables a variety of interactive options for the driver.

Buttons in the HMI may be physical buttons 455 but they alternatively or additionally may be digital buttons arranged in the display device 400 with a touch screen. The image signal to generate such digital buttons on the display device 400 may be generated by the ECU 500. This is, the ECU 500 may be configured to generate an image signal for providing digital buttons on the display device 400 such that the user or driver may press them for adjusting the displayed image. One example of digital button is a touch-and-drag button, where the user may perform a touch-and-drag operation on the display device 400 to adjust the displayed image, for example, to move the above-mentioned crop, e.g. performing a digital panning. In this case, the ECU 500 performs the digital panning based on the touch-and-drag interface instruction generated by the display device 400.

The control surface may be any surface that allows the user to manage the field of view (FOV) of the image acquisition unit 300 by touching said control surface (e.g. another display, another section of the display device, etc.) using any touch detection technology. The control surface may be implemented in a touch screen of the display device 400 preferably working as a multi-touch-sensitive display configured to receive a user's touch so as to move the image region (e.g. crop) within the captured image. Preferably, the touch screen is configured to detect different places touched simultaneously, in particular by a user's finger. The multi-touch-sensitive display allows tracking of images and touch carried out not only by one finger, but also complex actions, requiring operation with two or more fingers, can be performed. With particular advantage, a multi-touch-sensitive display may be further provided with a magnification of image regions by using two fingers and a change in the spacing of the fingers during contact is adjustable. In particular, together with the panning, a simple adjustment of the desired composition including the zoom level (zoom in/out) can be given by simple movements of the fingers.

Furthermore, the HMI 450 may be configured to manage the FOV of the rear-view mirror system 100 even without touching the control surface, for example, by gestures, using any gesture detection technology. Such touchless control surface may be implemented in different ways such as: i) by increasing the capacity sensibility of the screen, ii) by using a camera based on image-classifiers, iii) by employing radar technology. Other ways or technologies are of course possible.

Furthermore, the displayed image may encompass a portion of the lateral surface of the vehicle 10.

An electronics carrier 320, shown in FIGS. 3-6 comprising the above-mentioned unit ECU 500, is electrically connected to the first and second PCBs 325, 325' and the display device 400. In the example, the electronics carrier 320 and the first and second PCBs 325, 325' are formed as a single electronics component.

Figure 4:
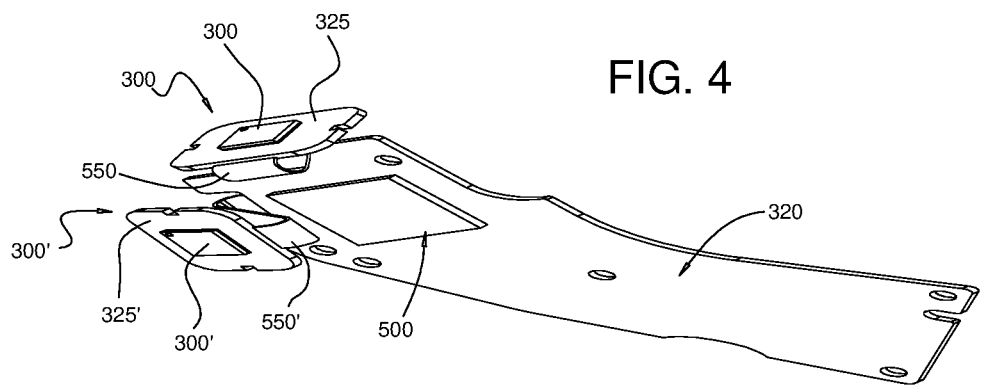
FIGS. 4, 5 and 6 are perspective views illustrating the electronics carrier of the rear-view mirror system of FIGS. 1-3 from different angles to show the relative positioning of the printed circuit boards and the electronics carrier.
Figure 5:
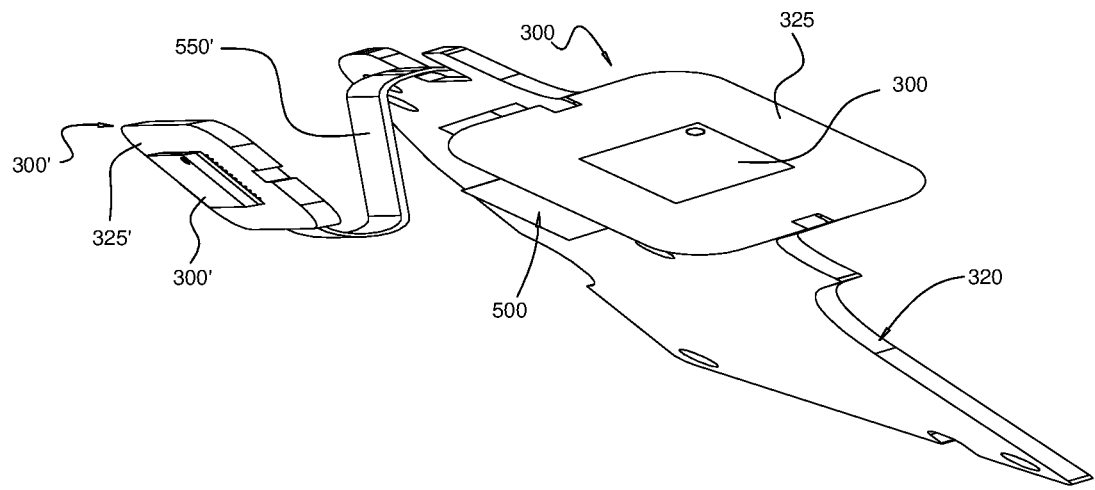
Figure 6:
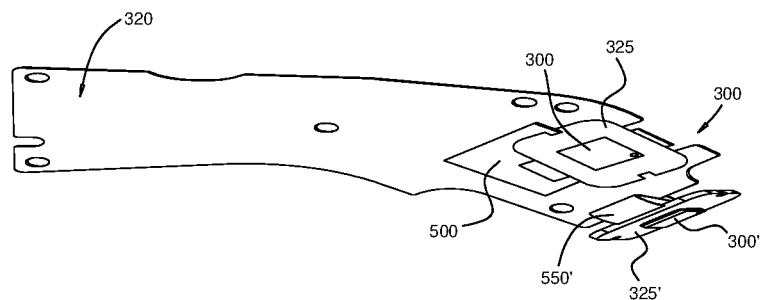

The electronics carrier 320 and the first PCB 325 are electrically connected through a first flexible flat connector 550, as shown in FIGS. 4 and 5, for transmitting high speed image data. The electronics carrier 320 and the second PCB 325' are also electrically connected through a second flexible flat connector 550 for transmitting high speed image data. The electronics carrier 320 and the first and second PCBs 325, 325' are arranged substantially perpendicular to each other as shown in FIGS. 4-6.

Figure 1:
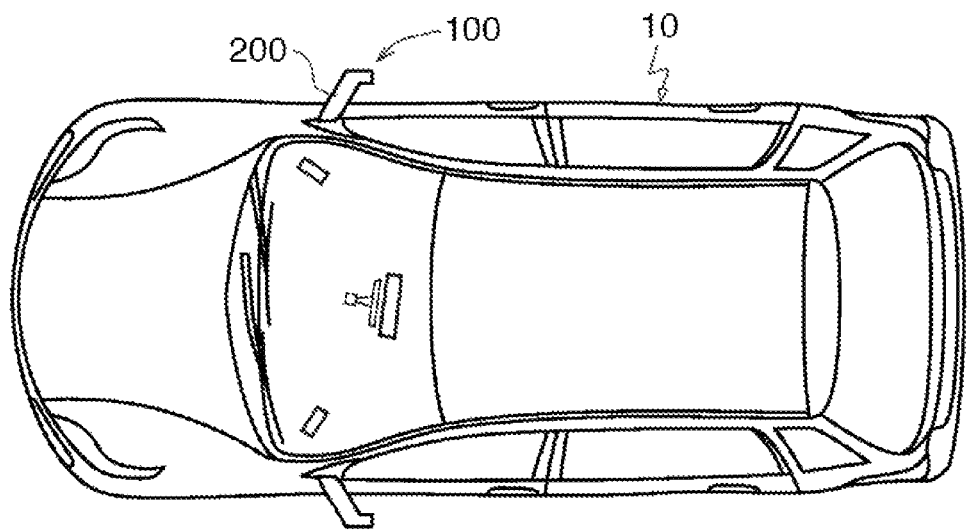
FIG. 1 is a top view of a motor vehicle fitted with the present rear-view mirror system.

As shown in FIG. 1 of the drawings, both the electronics carrier 320 and the ECU 500 are arranged in the interior space 201 of the winglet 200 such that at least in the operating position, they are arranged outside the motor vehicle 10.

In the example shown in FIG. 7, the mounting assembly 200 includes a blinker 720 that is received within an opening that may be formed in the first and/or second housing parts 210a, 210b, in the outer shell, or in the protective cover 220 that is part of the mounting assembly 200.

The first and second lens assemblies 310, 310' have corresponding first and second flanges 315, 315' projecting radially outwards therefrom, as shown in FIG. 3. The first and second flanges 315, 315' define corresponding interfaces for application of attaching means such as adhesive, preferably glue, for direct attachment of the lens assemblies 310, 310' to either an inner surface of the winglet 200 or an outer surface of the winglet 200.

The adhesive may be applied for example to a surface of the first and second flanges 315, 315' and/or an outer surface of the winglet 200. The PCBs 325, 325' are attached, such as by screwing or by glue, to an inner surface of the winglet 200 and with the corresponding image sensors 330, 330' and the lens assemblies 310, 310' aligned in optical connection to each other.

Alternatively, the adhesive may be applied to a bottom surface of the first and second flanges 315, 315' and/or an outer surface of the winglet 200. The PCBs 325, 325' attached to a bottom surface or perimeter portion of the lens assemblies 310, 310' which are inserted from the outside the winglet 200 towards the inside thereof with the flanges 315, 315' abutting the winglet 200.

Figure 10B:
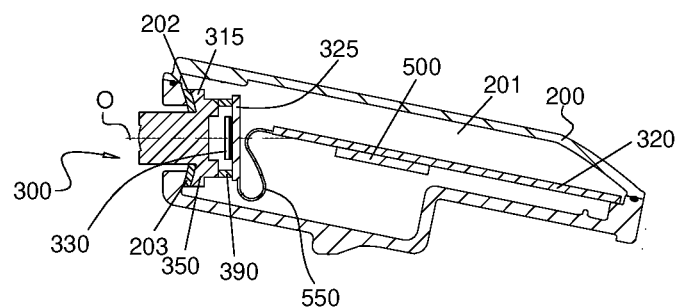

Still alternatively, as shown in FIGS. 10a and 10b, the adhesive 202 may be applied to a top surface of the first and second flanges 315, 315' and/or a bottom surface 203 of the winglet 200.

As illustrated in FIGS. 10a and 10b of the drawings, the mounting assembly 200 further comprises at least one positioning portion 350 for attaching the first lens assembly 300 and the first printed circuit board 325 to each other. In particular, the positioning portion 350 is part of or is attached to the first lens assembly 310. Said positioning portion 350 comprises a positioning element arranged projecting longitudinally along the first optical axis O towards the first printed circuit board 325 for attaching them to each other with a constant predetermined gap there between with the first image sensor 330 optically aligned with the first lens assembly 310. In this way, the PCBs 325, 325' are attached, such as glued by the second adhesive means 390, to a bottom surface or perimeter portion of the lens assemblies 310, 310'.

The lens assemblies 310, 310' and the PCBs 325, 325' are then fitted abutting the winglet 200. Therefore, the present rear-view mirror 100 allows mounting assemblies 200 with the same size to be used with lens assemblies 310,310' having different lengths. This means that although the required lens assemblies 310, 310' are of different lengths, the mounting assembly 200 having the same size can still be employed. As a result, different image acquisition units 300, 300' having different resolutions and field of views for different applications can be provided using the mounting assembly 200 with the same size for different lens assemblies 310, 310' having different lengths depending on the application.

FIGS. 10a and 10b show that the adhesive means 202 is arranged between the interface first flange 315 and a first holding surface 203. Also, the second adhesive means 390 is arranged at any location between the interface first flange 315 and the first PCB 325. More in particular, the second adhesive means 390 is arranged at any location between the first adhesive means 202 and the first PCB 325. More in particular, the second adhesive means 390 is arranged between the positioning element and the first PCB 325. In addition, the first image sensor 330 is arranged between the interface first flange 315 and the first PCB 325.

FIG. 10b shows an example where the holding surface 203 of the winglet 200 where said adhesive 202 is to be applied is non-planar. Alternatively or additionally, the interface of the first and second flanges 315, 315' may be also non-planar. More specifically, the interface of the first and second flanges 315, 315' has a radius of curvature substantially the same as a radius of curvature of the holding surface of the winglet 200. As a result, the lens assemblies 310, 310' can be moved relative to the winglet 200 so that the PCBs 325, 325' and the image sensors 330, 330' can be pre-assembled with the adhesive in a pre-cured state so that they both can be moved relative to the winglet 200 in several degrees of freedom as required before final assembly.

Figure 7A:
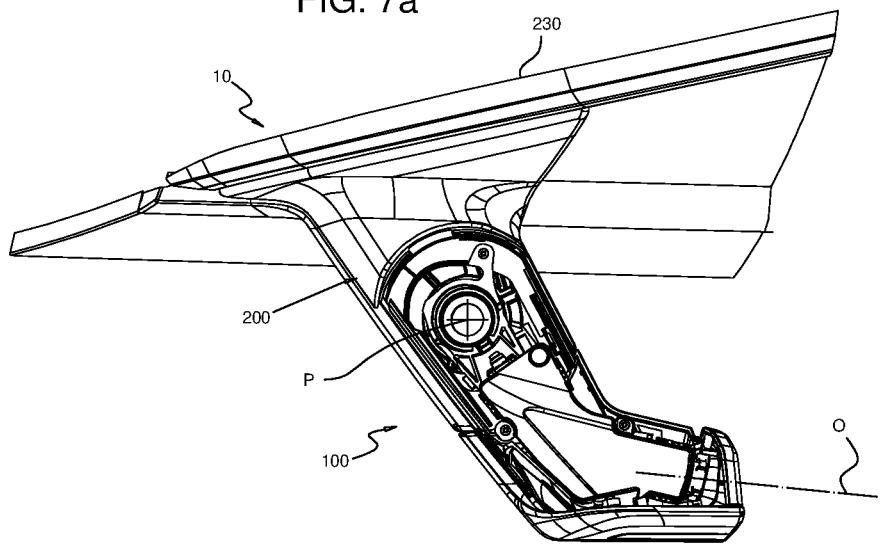
FIG. 7a is a top view of the present rear-view mirror system.
Figure 7B:
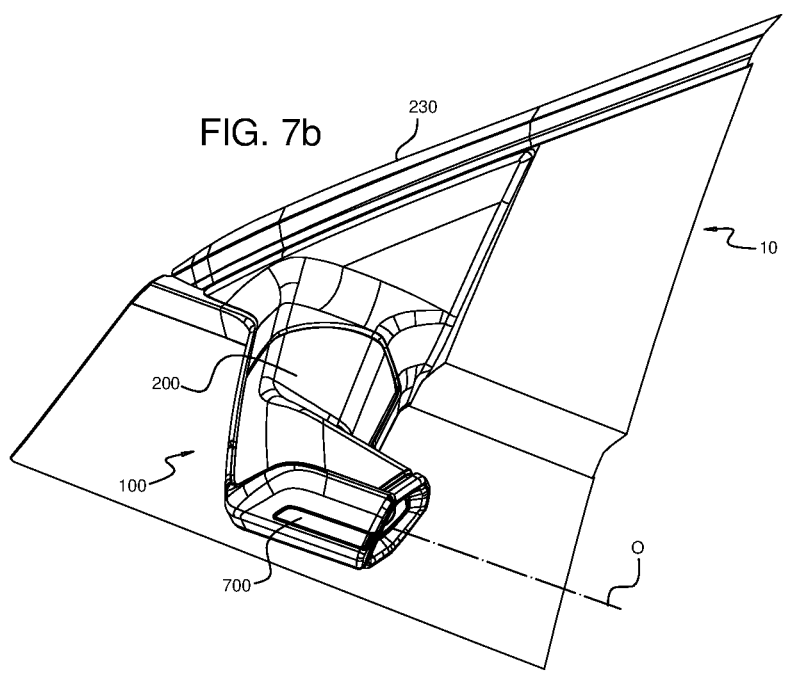
FIG. 7b is a general perspective view of the present rear-view mirror system.

A fixing surface 230 is formed in the mounting assembly 200 as shown in FIGS. 7a and 7b. In use, the fixing surface 230 is arranged abutting a portion of the vehicle 10 so as to secure the mounting assembly 200 outside the vehicle 10 at least in the operating position. The fixing surface 230 is thus suitable for attaching the mounting assembly 200 to the vehicle 10 and the first holding surface 203 to attach the mounting assembly 200 and the first lens assembly 310 directly to each other. The fixing surface 230 and the first holding surface 203 may be different surfaces of the mounting assembly 200.

Assembly the above-described rear-view mirror system 100 is performed by attaching the lens assemblies 310, 310' to the interior space 201 of the winglet 200 and placing the image sensors 330, 330' therein so as to establish an optical communication between the lens assemblies 310, 310' and the image sensors 330, 330'.

Attachment of the lens assemblies 310, 310' to the winglet 200 is carried out at any time after applying the adhesive means on at least one of the winglet 200 and the lens assemblies 310, 310'. In order to place the image sensors 330, 330' at the interior space 201 of the winglet 200, the lens assemblies 310, 310' are attached to the electronics carrier 320, that is, the corresponding PCBs 325, 325'. Finally, the adhesive means are cured such as, for example, by air, UV or thermal radiation.

FIG. 11 shows the mounting assembly 200 intended to be arranged on a lateral surface of the vehicle body. The mounting assembly 200 comprises the winglet 240 that project outward from the vehicle body at least in the operating position. The mounting assembly 200 further comprises a mounting structure 250 (e.g. a door mirror flag cover). The mounting structure 250 is adapted to be fixedly mounted on the lateral surface of the vehicle body, for example, on a door. The mounting structure 250 is further configured to support the winglet 240. As shown, the winglet 240 is configured such that a first interior space is defined therein. Further, the mounting structure 250 is configured such that a second interior space is defined therein. A shown in FIG. 11, the processor unit 501 and at least a portion of the electronics carrier 320 are arranged either in the first interior space or in the second interior space of the mounting structure. Thus, at least in the operating position, the electronics carrier 325 and the ECU 500 are both arranged outside the vehicle body.

Figure 12A:
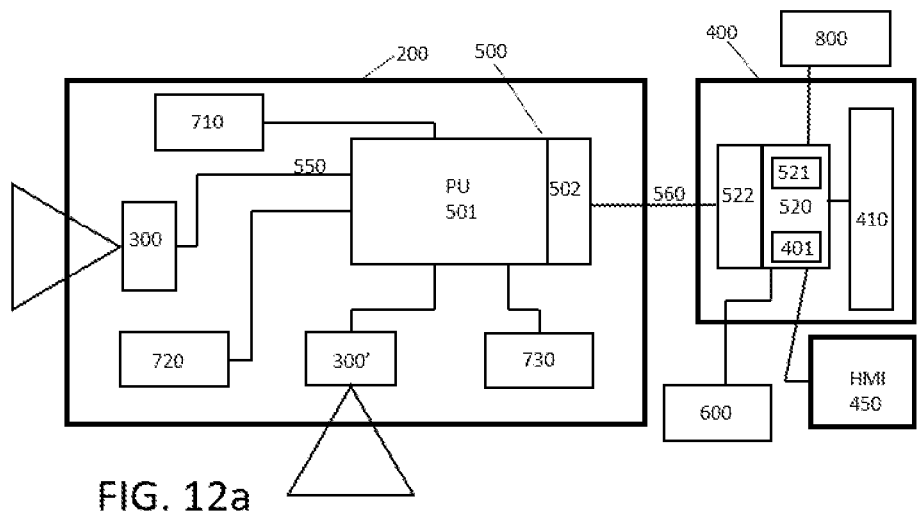
FIGS. 12a-12f schematically illustrate different possible architectures of the present rear-view mirror system.

FIG. 12a illustrates a mounting assembly 200, a display device 400, and a HMI 450. The mounting assembly comprises an electronic control unit (ECU) 500, the first acquisition unit 300, and a peripheral device 700. The ECU 500 comprises a processor unit (PU) 501 that, in turn, comprises at least a serializer 502 configured to serialize the image date generated by the first acquisition unit 300 (e.g., the raw image data generated by the image sensor 330, or the image data generated by the first ISP). The peripheral device 700 is any electronic device that may be activated or deactivated and may fit properly within the mounting assembly as required. In particular, the peripheral device 700 comprises, in turn, a lighting device 710, a blinker 720, a power fold 730, and the second image acquisition unit 300'. Other peripheral devices are of course possible such as a blind spot detection (BSD) device, a camera heater, a radar device, or a lidar device (not shown). The lighting device 710 is, for example, a puddle lamp or a logo lamp. As shown, both the peripheral device 700 and the first acquisition unit 300 are connected to the processor unit (PU) 501. In particular, the lighting device 710, the blinker 720, the power fold device 730, the second acquisition unit 300' and the first acquisition unit 300 are electrically connected to the processor unit (PU) 501.

The connection between the first acquisition unit 300 and the processor unit (PU) 501 is achieved through a first flexible flat connecting means 550. Similarly, a second flexible flat connecting means 550' is used to electrically connect the second acquisition unit 300' and the processor unit (PU) 501.

A second electronic control unit 520 is arranged in the vehicle body.

As shown, the display device 400 comprises the second electronic control unit 520, a deserializer 522, and a display panel 410. Further, the ECU 500 of the mounting assembly 200 and the display device 400 are connected through a coaxial cable 560 or a twisted pair cable. As explained, said coaxial cable 560 or a twisted pair cable is a connecting means for transmitting at least an image signal including high bandwidth image data, bidirectional control data, and optionally electric power. For example, high bandwidth is above 1 GHz. The image signal is transmitted in one direction, from the processor unit (PU) 501 to the second electronic control unit 520 (e.g. second processor unit 521). Further, electric power is transmitted over the coaxial cable. Power of coaxial is a technology that supports simultaneous transmission of power, high-resolution video signal, and control signal.

The HMI 450 is arranged in any location inside the motor vehicle 10 as long as the user can interact with said HMI 450. FIGS. 12a-12d illustrate the HMI 450 arranged outside the display device 400. Instead, FIG. 12e illustrates the display device 400 comprising the HMI 450. For example, the display device 400 provides a control surface where the user may interact, in particular, through a digital button or a touch and drag movement. The HMI 450 is configured to receive a user command and send it to the second electronic control unit 520. The second electronic control unit 520 is configured to deserialize at least the serialized captured image from the processor unit 501 through the deserializer 522. Further, said second electronic control unit 520 comprises the second processor unit 521 at least being configured to select at least an image region from the deserialized captured image, the image region being smaller than the deserialized captured image. The Human Machine Interface (HMI) 450 is configured to generate an interface instruction such that the second processor unit 521 can move the image region within the deserialized captured image. The display panel 410 is configured to provide a displayed image to the user or driver. Said displayed image is derived at least in part from the image region (e.g. crop).

FIG. 12a further illustrates the second electronic control unit 520 connected to a vehicle bus 600 and a power supply 800. Therefore, the second electronic control unit 520 and the HMI 450 may be connected to each other, for example, by at least one of: (i) a flexible flat connecting means, and (ii) the vehicle bus 600. Other types of connecting means are of course not ruled out.

Figure 12B:
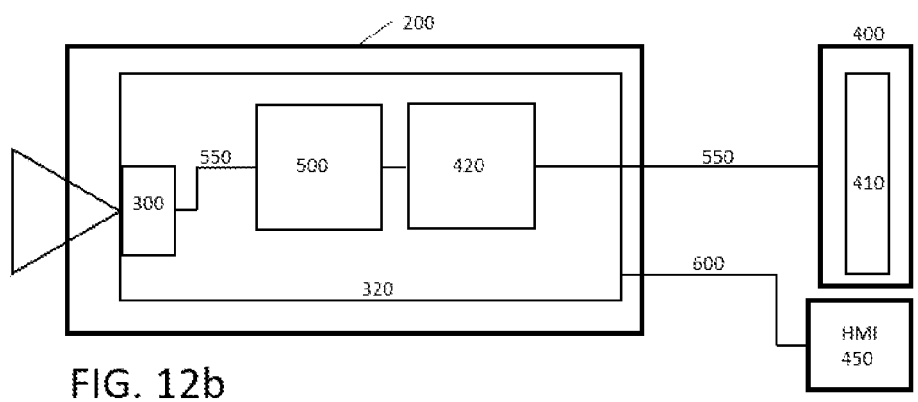

FIG. 12b schematically illustrates a mounting assembly 200 that comprises an electronics carrier 320 that comprises, in turn, the ECU 500 and the first printed circuit board 325. The ECU 500 comprises the processor unit 501 and the display controller 420. The ECU 500 is configured to generate a processed image signal to the display device 400 for displaying to the user the displayed image. The electronics carrier 320, the electronic control unit 500, the processor unit 501, and the display controller 420 are arranged at least partially in the mounting assembly 200. The first acquisition unit 300 and the ECU 500 are connected to each other through a flat connecting means 550. The ECU 500 and the display device 400 are connected to each other through any connecting means excluding coaxial cables and twisted pair cables. For example, said connecting means is a flexible flat connecting means 550. The HMI 450 and the ECU are connected to each other through the vehicle bus 600.

Figure 12C:
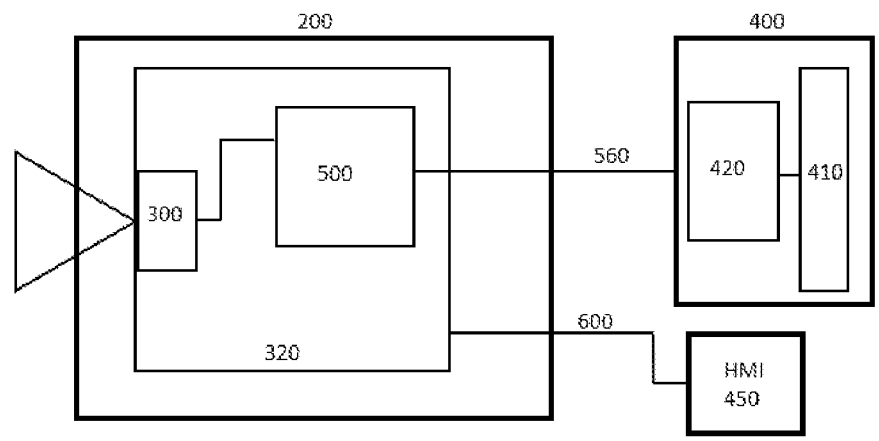

FIG. 12c is similar to FIG. 12b, but the display controller 420 is arranged in the display device 400. The ECU 500 and the display device 400 are connected to each other through a coaxial cable 560 or a twisted pair cable. The ECU 500 may include a serializer 502 (not shown), and the display controller 420 may also include a deserializer.

Figure 12D:
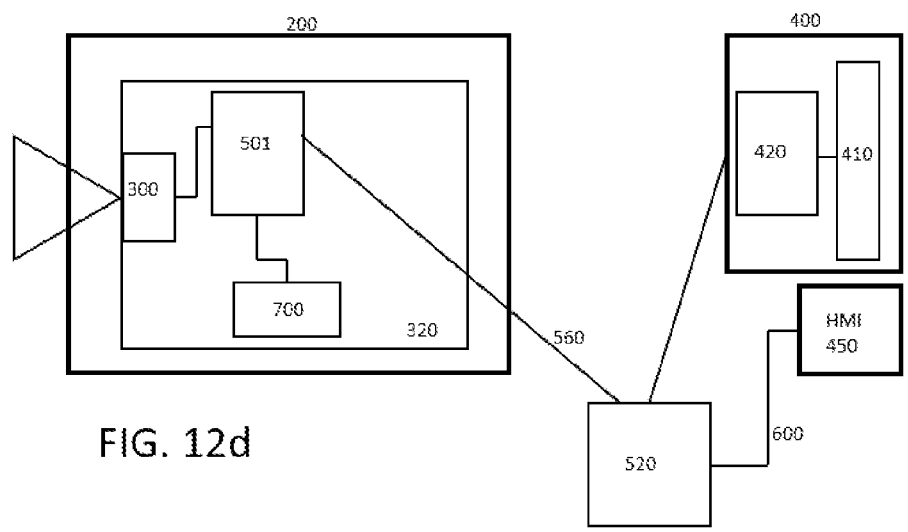
Figure 12E:
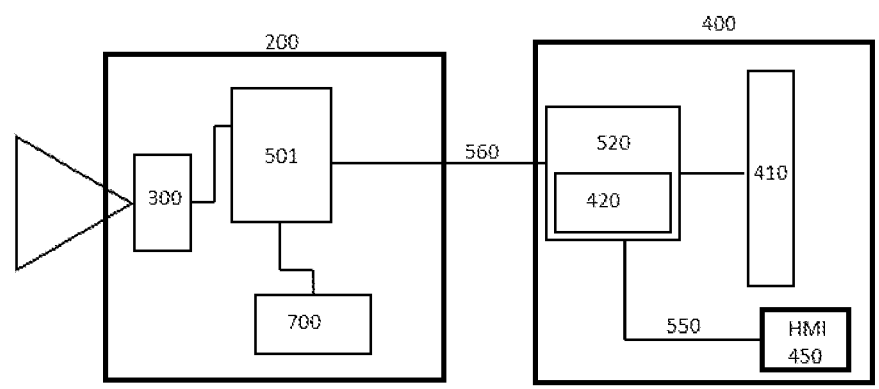

FIG. 12d schematically illustrates a three-box rear-view mirror system. This is, the architecture of the rear-view mirror system comprises three boxes. The first box is arranged in the mounting assembly 200. The second box is arranged in the vehicle body and out of the display device 400. The third box is arranged in the display device 400. The electronics carrier 320, the first image acquisition unit 300, and any peripheral device 700 are arranged in the mounting assembly 200, this is, in the first box. The electronics carrier 320 comprises the ECU 500 that, in turn, comprises the processor unit (PU) 501. Again, the peripheral device 700 and the first acquisition unit 300 are connected to the processor unit (PU) 501. The second electronic control unit 520 includes a second processor unit 521. The ECU 500 and the second electronic control unit 520 are connected through a coaxial cable 560 or a twisted pair cable. In particular, the processor unit (PU) 501 and the second processor unit 520 are connected through a coaxial cable 560 or a twisted pair cable. The second electronic control unit 520 is configured to receive the serialized captured image from the ECU 500. Again, the second processor unit 521 is configured to select at least an image region (e.g. crop) from the deserialized captured image, the image region being smaller than the deserialized captured image. The Human Machine Interface (HMI) 450 is configured to generate an interface instruction such that the second processor unit 521 can move the image region within the deserialized captured image. The display panel 410 is configured to provide a displayed image to the user or driver. Said displayed image is derived at least in part from the image region. This architecture makes it possible to delocalize the second electronic control unit 520 from the display device. As both the display device 400 and the ECU 500 generate heat and electromagnetic radiation, this solution is advantageous in that it allows to reduce the thermal effect and the effect of electromagnetic radiation.

FIG. 12e illustrates a processor unit 501, a first image acquisition unit 300', and a peripheral device 700 provided in the mounting assembly 200. Again, the peripheral device 700 and the first acquisition unit 300 are connected to the processor unit (PU) 501. The second electronic control unit 520 is provided in the display device 400. The display controller 420 is also provided in the display device 400. For example, the second electronic control unit 520 comprises the display controller 420. The mounting assembly 200 and the display device 400 are electrically connected to each other through a coaxial cable 560 or a twisted pair cable. In particular, the processor unit 501 and the second electronic control unit 520 are electrically connected to each other through a coaxial cable 560 or a twisted pair cable. As shown, the HMI 450 is implemented in the display device 400. The HMI is connected to the second electronic control unit 520 through a connecting means, for example, a flexible flat connecting means 550.

Figure 12F:
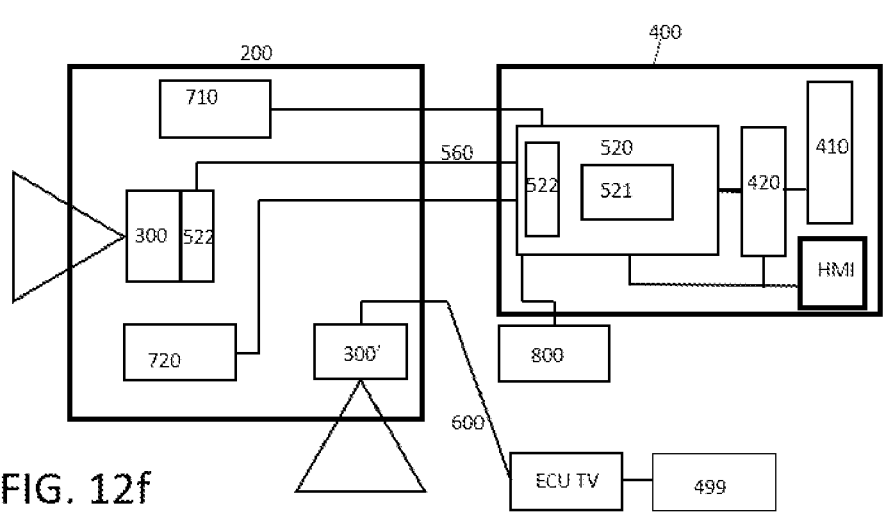

FIG. 12f is an example of a rear-view mirror system comprising (i) a mounting assembly 200 provided with a first image acquisition unit 300, and (ii) a display device 400 provided with a second electronic control unit 520. The second image acquisition unit 300' is connected to an additional electronic control unit arranged in the vehicle body through a coaxial cable 560. Said additional electronic control unit is further connected to a display for providing a top-view video stream. In this example, there is no ECU 500 in the mounting assembly 200. In particular, there is no processor unit 501. Instead, each of the first image acquisition unit 300, the second image acquisition unit 300', the lighting device 710, and the blinker 720 are electrically connected to a different connecting means 560, 600, 599, 598 that come out from the mounting assembly 200. This may be a disadvantage as a plurality of electric wires come out from the mounting assembly 200 which involves complexity, and increases the assembly time and the overall cost of the rear-view mirror system.

Within the present disclosure, the processor unit (PU) 501, 521 may execute a computer program so as to adjust and/or generate an image signal that includes video stream data. The processor unit (PU) may be a system-on-chip (SoC) which is an integral circuit that integrates several electronic components including central processing unit (CPU), memory interfaces, on-chip input/output devices, input/output interfaces, secondary storage interfaces, and graphic processing unit (GPU). The several electronic components may be on a single substrate or microchip. In fact, the SoC may integrate the mentioned electronic components on a single circuit die. Also, the processor unit (PU) may comprise an electronic component related to overlays. The overlays are configured to add graphical data to the video stream. Therefore, the processor unit (PU) 501, 521 may be configured to control a plurality of logic blocs or electronic components. Further, the ISP may control the image sensor parameters and transforms the raw video data from the image sensor 330, 330' to a standard format. As stated above, the ISP may be integrated into the image sensor 330, 330', or alternatively may be arranged on the electronics carrier 320. Particularly, the ISP may be an electronic component of the processing unit (PU). Furthermore, the display controller may be arranged in the display device (400) or in the mounting assembly 200. In any case, it is configured to adapt the incoming video stream to the format accepted by the display panel.

Although one example has been disclosed herein, other alternatives, modifications, uses and/or equivalents thereof are possible. Furthermore, all possible combinations of the described example are also covered. Thus, the scope of the present disclosure should not be limited by a particular example, but should be determined only by a fair reading of the claims that follow. Reference signs related to drawings in parentheses in a claim are solely for attempting to increase the intelligibility of the claim, and shall not be construed as limiting the scope of the claim.

What is claimed is:

1. A rear-view mirror system for a motor vehicle having a motor vehicle body, the rear-view mirror system comprising:
    a mounting assembly located at an exterior part of the motor vehicle body when the mounting assembly is at least in an operating position;
    a first image acquisition unit at least partially received within the mounting assembly, wherein the first image acquisition unit is arranged to acquire a captured image from an exterior field of view of the motor vehicle extending at least outside the motor vehicle;
    a display device comprising at least one screen located inside the motor vehicle; and
    an electronics carrier comprising an electronic control unit electrically connected to the first image acquisition unit, the electronic control unit being configured to generate an image signal to the display device for displaying to a user a displayed image derived at least in part from the captured image,
    wherein both the electronics carrier and the electronic control unit are arranged at least partially in the mounting assembly;
    wherein the electronic control unit includes, in turn, a processor unit at least configured to serialize at least the captured image,
    wherein the processor unit is connected at least to the first image acquisition unit and a peripheral device,
    wherein the peripheral device is at least one of a second image acquisition unit, a blind spot device (BSD), a blinker, a power fold, a lighting device, a sensor device, and a camera heater; and
    a second electronic control unit arranged in the motor vehicle body, wherein the second electronic control unit comprises, in turn, a deserializer and a second processor unit, the deserializer being configured to deserialize at least the captured image from the processor unit forming a deserialized captured image, and the second processor unit at least being configured to select at least an image region from the deserialized captured image, the image region being smaller than the deserialized captured image, wherein the rear-view mirror system further comprises a Human Machine Interface (HMI) configured to generate an interface instruction such that the second processor unit can move the image region within the deserialized captured image, and wherein the displayed image is derived at least in part from said image region.

2. The rear-view mirror system of claim 1, wherein the first image acquisition unit comprising:
    a first lens assembly defining a first optical axis (O);
    a first printed circuit board; and
    a first image sensor in optical communication with the first lens assembly and coupled to the first printed circuit board, wherein the electronics carrier and the first printed circuit board are electrically connected to each other through a first flexible flat connecting means for transmitting image data.

3. The rear-view mirror system of claim 2, wherein the electronics carrier and the first printed circuit board are formed as a single electronics component.

4. The rear-view mirror system of claim 2, wherein the first flexible flat connecting means is a flexible printed circuit board associated with the electronics carrier.

5. The rear-view mirror system of claim 2, wherein the first printed circuit board is arranged substantially perpendicular to the electronics carrier.

6. The rear-view mirror system of claim 1, wherein the electronic control unit is configured to select at least an image region from the captured image acquired by the first image acquisition unit, the image region being smaller than the captured image, wherein the rear-view mirror system further comprises a Human Machine Interface (HMI) that is configured to generate an interface instruction such that the electronic control unit can move the image region within the captured image, and wherein the displayed image is derived at least in part from said image region.

7. The rear-view mirror system of claim 1, wherein the electronic control unit is configured to generate a processed image signal to the display device for displaying to the user the displayed image through a connecting means excluding a coaxial cable and a twisted pair cable.

8. The rear-view mirror system of claim 7, wherein the connecting means to send the processed image signal to the display device is a flexible flat connecting means.

9. The rear-view mirror system of claim 2, wherein the mounting assembly further comprises a first holding surface with a first attaching means being applied for direct attachment of the first lens assembly and the mounting assembly to each other.

10. The rear-view mirror system of claim 9, wherein the first lens assembly comprises at least a first flange projecting radially outwards from the first lens assembly.

11. The rear-view mirror system of claim 10, wherein the first flange has an interface for attachment to the mounting assembly, wherein the first holding surface is located outside the mounting assembly or located inside the mounting assembly.

12. The rear-view mirror system of claim 10, wherein the first attaching means comprise an adhesive means arranged between at least the first flange and the first holding surface.

13. The rear-view mirror system of claim 11, wherein at least one of the first holding surface and the interface of the first flange is a non-planar surface so that the first lens assembly can be moved relative to the mounting assembly.

14. The rear-view mirror system of claim 1, wherein the first image acquisition unit and the electronic control unit are connected to each other through a first flexible flat connecting means for transmitting image data.

15. The rear-view mirror system of claim 1, wherein the electronic control unit and the second electronic control unit are connected to each other through a connecting means for transmitting at least high bandwidth image data, and bidirectional control data.

16. The rear-view mirror system of claim 1, wherein the mounting assembly comprises a winglet and a mounting structure, wherein the mounting structure is adapted to be fixedly mounted on a lateral surface of the motor vehicle body and is further adapted to support the winglet, the winglet being projected outward from the motor vehicle body at least in the operating position, wherein a first interior space is defined within the winglet, the first image acquisition unit being at least partially received within the first interior space, wherein the mounting structure is configured such that a second interior space is defined therein, and wherein both the electronics carrier and the electronic control unit are arranged at least partially in the first interior space or in the second interior space.

17. The rear-view mirror system of claim 1, wherein the mounting assembly comprises an outer shell, wherein the outer shell is a one-single injection-molded part over and around at least a portion of the electronics carrier such that said portion of the electronics carrier is substantially encapsulated within the outer shell.

18. The rear-view mirror system of claim 2, further comprising a second image acquisition unit that includes:
at least a second lens assembly defining a second optical axis (O') arranged at an angle with respect to the first optical axis (O);
a second printed circuit board; and
a second image sensor in optical communication with the second lens assembly,
wherein the second image acquisition unit is arranged to acquire another captured image from another exterior field of view of the motor vehicle extending at least outside the motor vehicle; and
wherein both the second lens assembly and the second printed circuit board are arranged at least partially inside the mounting assembly; and
wherein the electronic control unit is configured to receive electronic data from the second image sensor, the electronics carrier and the second printed circuit board are electrically connected to each other via a second flexible flat connecting means, and wherein the electronics carrier and at least one of the first printed circuit board and the second printed circuit board are formed as a unitary electronics support.

19. A rear-view mirror system for a motor vehicle having a motor vehicle body, the rear-view mirror system comprising:
a mounting assembly located at an exterior part of the motor vehicle body when the mounting assembly is at least in an operating position;
a first image acquisition unit at least partially received within the mounting assembly, wherein the first image acquisition unit is arranged to acquire a captured image from an exterior field of view of the motor vehicle extending at least outside the motor vehicle;
a display device comprising at least one screen located inside the motor vehicle; and
an electronics carrier comprising an electronic control unit electrically connected to the first image acquisition unit, the electronic control unit being configured to generate an image signal to the display device for displaying to a user a displayed image derived at least in part from the captured image,
wherein both the electronics carrier and the electronic control unit are arranged at least partially in the mounting assembly;
wherein the electronic control unit includes, a processor unit at least configured to serialize at least the captured image,
wherein the processor unit is connected at least to the first image acquisition unit and a peripheral device,
wherein the peripheral device is at least one of a second image acquisition unit, a blind spot device (BSD), a blinker, a power fold, a lighting device, a sensor device, and a camera heater;

wherein one of a twisted pair cable and a coaxial cable extends from the mounting assembly connecting the electronic control unit to a second electronic control unit such that the peripheral device is activated and deactivated; and wherein the one of a twisted pair cable and a coaxial cable is adapted for transmitting at least bandwidth image data and bidirectional control data;

wherein the second electronic control unit is arranged in the vehicle body; and wherein the second electronic control unit includes a deserializer configured to deserialize at least the serialized captured image from the processor unit; and wherein the second electronic control unit one of includes and connects to a display controller associated with the display device.

* * * * *